US007775866B2

(12) United States Patent
Mizuguchi et al.

(10) Patent No.: US 7,775,866 B2
(45) Date of Patent: Aug. 17, 2010

(54) GAME APPARATUS AND METHOD FOR FALLING BLOCK GAME WITH LAUNCHED RISING OBJECTS

(75) Inventors: Tetsuya Mizuguchi, Tokyo (JP); Masahiro Sakurai, 107-4-702, Bentencho, Shinjuku-ku, Tokyo (JP)

(73) Assignees: Bandai Co., Ltd., Tokyo (JP); Q Entertainment, Inc., Tokyo (JP); Masahiro Sakurai, Tokyo (JP); Namco Bandai Games, Inc., Tokyo (JP)

( * ) Notice: Subject to any disclaimer, the term of this patent is extended or adjusted under 35 U.S.C. 154(b) by 997 days.

(21) Appl. No.: 11/138,693

(22) Filed: May 27, 2005

(65) Prior Publication Data

US 2005/0277456 A1    Dec. 15, 2005

(30) Foreign Application Priority Data

May 27, 2004    (JP) .............................. 2004-157986

(51) Int. Cl.
 *A63F 13/00* (2006.01)
(52) U.S. Cl. ............................................. 463/9; 463/30
(58) Field of Classification Search .................. 463/19, 463/20, 9
See application file for complete search history.

(56) References Cited

U.S. PATENT DOCUMENTS 5,184,830 A * 2/1993 Okada et al. .................. 463/29

6,458,032 B1    10/2002  Yamagami

FOREIGN PATENT DOCUMENTS

| EP | 0817124 A2 | 7/1998 |
|---|---|---|
| JP | 3019970 | 3/2000 |
| JP | 2003-260269 | 9/2003 |

OTHER PUBLICATIONS

Wikipedia. 'Tetris Attack' <URL: http://en.wikipedia.org/wiki/Tetris_Attack>.*
Argonaut. 'Argonaut's Tetris Strategy Guide' <URL: http://www.gamefaqs.com/portable/gameboy/file/198944/3112>.*
Wikipedia. 'Tetris Blast' <URL: http://en.wikipedia.org/wiki/Tetris_Blast>.*
Baker, Mark. "A Twist that's a Blast" <URL: http://www.amazon.com/Tetris-Blast-Game-Boy/product-reviews/B000035XFE/ref=cm_cr_dp_all_summary?ie=UTF8&showViewpoints=1&sortBy=bySubmissionDateDescending>.*
Japanese Office Action dated Jul. 11, 2005.
"Get started on Puyo puyo! Let's learn how to play with Car-kun!", Dengeki PlayStation, Media Works, vol. 5 No. 36, Dec. 24, 1999.

* cited by examiner

*Primary Examiner*—John M Hotaling, II
(74) *Attorney, Agent, or Firm*—Buchanan Ingersoll & Rooney PC

(57) ABSTRACT

Display control is made so that meteor blocks (101-104) falling from the outer space are piled up on the surface of earth. When the player operates a cursor (106) for piled up meteor blocks (105) to designate them as objects to be operated, and presses a button, the meteor blocks are vertically re-arranged. When the meteor blocks of the same type line up as a result of re arranging, they can be ignited and launched. When the meteor blocks rise up to the outer space, they can be cleared. On the other hand, when the meteor blocks stall halfway, they cannot be cleared, and fall on the surface of earth again.

26 Claims, 19 Drawing Sheets

IGNITE AND LAUNCH METEOR BLOCKS OF SAME TYPE, AND CLEAR BLOCKS IN OUTER SPACE

CURSOR MOVEMENT

RE-ARRANGE METEOR
BLOCKS IN CURSOR

IGNITE AND LAUNCH METEOR BLOCKS OF
SAME TYPE, AND CLEAR BLOCKS IN OUTER SPACE

PRESS BUTTON WHEN
ONLY ONE METEOR BLOCK IS DESIGNATED

METEOR BLOCK IS SHOT
(RISES ONLY PARTWAY)

WHEN BLOCK IS SHOT TOWARD
FALLING METEOR BLOCK

COLLIDING METEOR BLOCKS
ARE EXPLODED AND CLEARED

WHEN BLOCK IS SHOT
TOWARD RISING METEOR BLOCKS

BLOCK UNITES WITH
RISING METEOR BLOCKS

WHEN CURSOR IS MOVED TO
RISING METEOR BLOCKS TO RE-ARRANGE
AND IGNITE THEM

IMPELLING FORCE INCREASES
AND BLOCKS ARE ACCELERATED

GAME APPARATUS AND METHOD FOR FALLING BLOCK GAME WITH LAUNCHED RISING OBJECTS

FIELD OF THE INVENTION

The present invention relates to a game in which the user operates a plurality of objects that stop falling to re-arrange positions of the objects and clear the objects and, more particularly, to a designation technique and display control technique of objects to be re-arranged.

BACKGROUND OF INVENTION

Conventionally, games in a category so called "falling block games" such as Tetris, Columns, and the like are available in the game market. The "falling block game" is a kind of computer game and a generic name for a game in which objects are falling from the upper portion of a display area.

For example, in Tetris, when one row is fully filled with blocks, it is indicated that blocks to be cleared are settled, and the blocks arranged in one row are then immediately cleared. On the other hand, in Columns, when three or more blocks of the same color run on in the vertical, horizontal, or oblique direction, it is indicated that blocks to be cleared are settled, and the blocks are then immediately cleared.

Also, there has been proposed a game in which the user operates drug capsules of two colors which are falling automatically to fall onto viruses arranged in advance, and when three or more virus and drug capsules with the same color run on vertically or horizontally, it is displayed that blocks to be cleared are settled, and they are cleared immediately (Japanese Patent No. 3019970).

In any of the conventional "falling block games", the player can operate only new blocks which are falling independently of the player's will. The player cannot operate blocks which stop falling and are fixed in position. In other words, the player himself or herself cannot designate a block to be operated at all.

These games have a common simple rule: how quickly the player operates falling blocks and combines them on fallen blocks, and no novel games are available.

SUMMARY OF THE INVENTION

It is, therefore, an object of the present invention to solve the above and other problems. Note that other problems will be understood throughout the specification.

In order to solve the above problems, according to the present invention, the player can select an object to be operated in a game called "falling block game". For example, as an object to be operated, objects other than falling objects which are newly falling (e.g., stop objects that stop falling or the like) can be designated.

When a predetermined combination is formed by re arranging a plurality of stop objects, the stop objects are raised (launched) and cleared.

A plurality of rising objects (including stop objects that begin to rise, and rising stop objects which begin to fall once they are raised) can be designated as objects to be operated, and the positions of the plurality of designated rising objects can be re-arranged.

When the number of designated objects is smaller than a predetermined value, the objects are raised to a position where they are not cleared. Note that display control may be made so that after the objects (rising stop objects) stop rising, they begin to fall again.

When a falling object coming from the upper portion of the display area of the display screen collides against an object which is rising halfway (to a position where it is not cleared) (the rising object contacts the falling object), both the objects may be cleared. Note that display control may be made so that both the objects are cleared only when they are of the same type, or both the objects fall if they are of different types (e.g., different colors, shapes, or the like).

When a plurality of rising objects are rising, and a rising stop object rises from below the plurality of rising objects and collides against the rising object, display control may be made so that the rising stop object unites with (contacts) the rising object to form a new rising object.

Display control may be made so that not only objects that match the predetermined combination but also those carried on the objects are raised together.

When the objects that match the predetermined combination and those carried on the objects do not meet a condition (joint rising condition) that permits them to rise together, display control is made to inhibit these objects from rising or not to raise the objects up to the clear position.

According to the present invention, since the player can operate objects other than newly falling objects (e.g., objects that stop falling or the like), the objects to be operated are quite contrary to those in the conventional "falling block games", and the player can experience novel operability.

It is a very fresh idea that re-arranged objects are cleared after they are raised in place of being cleared directly, and the player can feel exhilaration unlike the conventional "falling block games".

Since the player can designate and operate not only stop objects but also rising objects and objects which begin to fall after rising, options of objects to be operated can be broadened, and objects can be combined more intricately.

If the number of designated stop objects is smaller than a predetermined value, since the rising range is limited partway (to a position where objects are not cleared), the difficulty level of the game can be maintained to be appropriate one.

When an object is raised to collide against a falling object, not only the falling object is intercepted (collided) but also the rising object is cleared. Hence, the number of clear conditions increases, and the player can enjoy more elaborate clear conditions than the conventional games.

When a plurality of rising objects are rising, and a rising stop object rises from below the plurality of rising objects and collides against the rising object, the rising stop object unites with the rising object, and the rising stop object can also be cleared, thus counterchanging the clearing conditions. Since the clear conditions are counterchanged, the strategy becomes important, and the player can experience the difficulty and a sense of mastery enjoy unlike in the conventional games.

Since not only objects that match the predetermined combination but also those carried on the objects are raised together, objects falling from the upper portion of the display area of the display screen can be cleared at once, and the player can experience the best part of clearing.

When the objects that match the predetermined combination and those carried on the objects do not meet a condition (joint rising condition) that permits them to rise together, display control is made to inhibit these objects from rising or not to raise the objects up to the clear position. Hence, simultaneous clearing cannot be simply executed, and the attraction is further enhanced although the difficulty increases.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

An embodiment that helps understand the generic concept; concept between generic and subordinate concepts, and subordinate concept of the present invention will be described hereinafter. The appended claims do not always describe all concepts included in the following embodiment. However, since such concepts are not excluded on purpose from the technical scope of the patent invention but are equivalent to the patent invention, they are not described in the appended claims in some cases.

Figure 1:
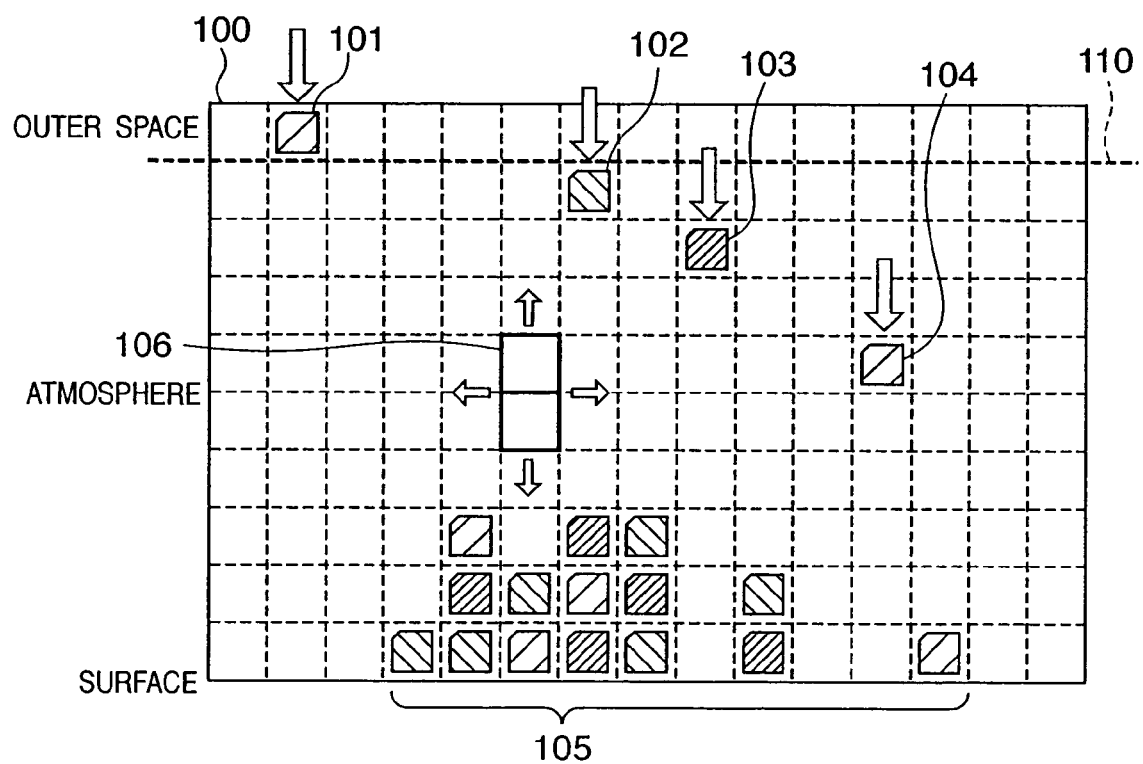
FIG. 1 shows a basic display example of a game according to an embodiment of the present invention.

FIG. 1 shows a basic display example of a game according to this embodiment. The concept of this game will be explained first. In this game, meteor blocks fall from the outer space (the upper portion of a display area of a display screen) toward the surface of earth (the lower portion of the display area of the display screen), and the player designates and re-arranges a plurality of meteor blocks which lie (fall) on the surface of earth (the lower portion of the display area of the display screen) to change the meteor blocks to rockets (blocks that can rise). The meteor blocks which have changed to rocket blocks (blocks that can rise) are launched (raised) toward the outer space (the upper portion of the display area of the display screen) and are cleared when they reach the outer space (the upper portion of the display area of the display screen).

On a field 100 in FIG. 1, falling blocks 101 to 104 represent meteor blocks which are falling toward the surface of earth (the lower portion of the display area of the display screen). The field 100 is a basic display area. A display area which displays information such as a score and the like is present outside the field 100. When the falling blocks fall via the atmosphere (the middle portion of the display area of the display screen) and land on the surface of earth (the bottom of the field 100) or other blocks (meteor blocks which stop), they stop falling, and become stop blocks 105. Note that FIG. 1 illustrates three different types of blocks for the sake of simplicity, and the present invention can adopt two or more different types of blocks. If approximately five different types of blocks are adopted, an appropriate game difficulty level can be set. The differences of block types can be identified by colors, patterns, shapes, and the like.

A cursor 106 is a pointer used to allow the player to designate an object to be operated such as an object to be re-arranged, an object to be shot, or the like. The cursor 106 moves upward or downward, or to the right or left in accordance with an operation instruction from an operation unit such as direction keys provided to a game operation unit. "Shoot" is to launch only stop blocks upward of the display area of the display screen when stop blocks fewer than a maximum number of blocks that can be accommodated in the cursor are accommodated in the cursor.

A line 110 is a boundary line indicating the inside and outside of the atmosphere, and a block that rises beyond this line is cleared. In this sense, the position indicated by the line 110 can also be expressed as a block clear position.

The flow from re-arrangement of meteor blocks until the meteor blocks are ignited (meteor blocks are changed to blocks that can rise) and launched (blocks that can rise are raised) will be described below using FIGS. 2 to 5.

Figure 2:
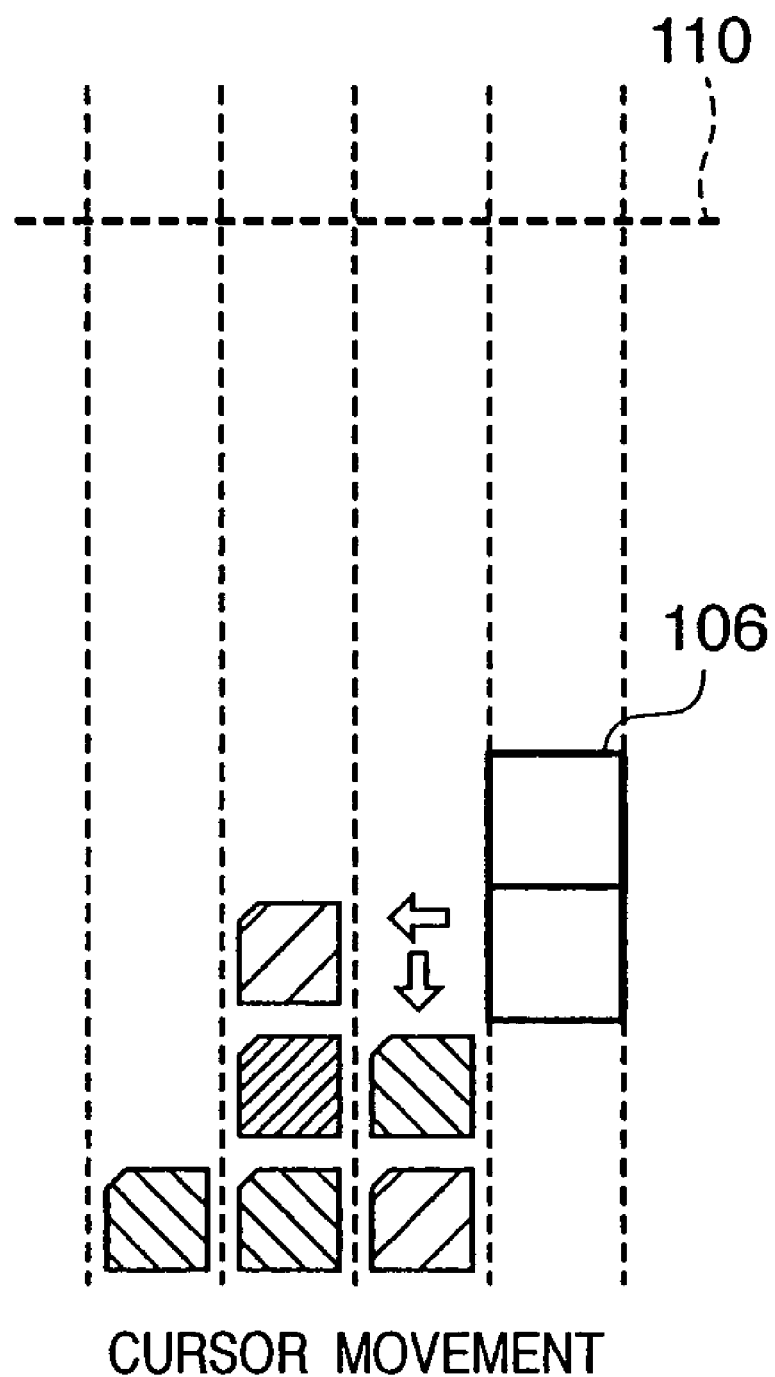
FIGS. 2 and 3 show a move example of a cursor according to the embodiment of the present invention.
Figure 3:
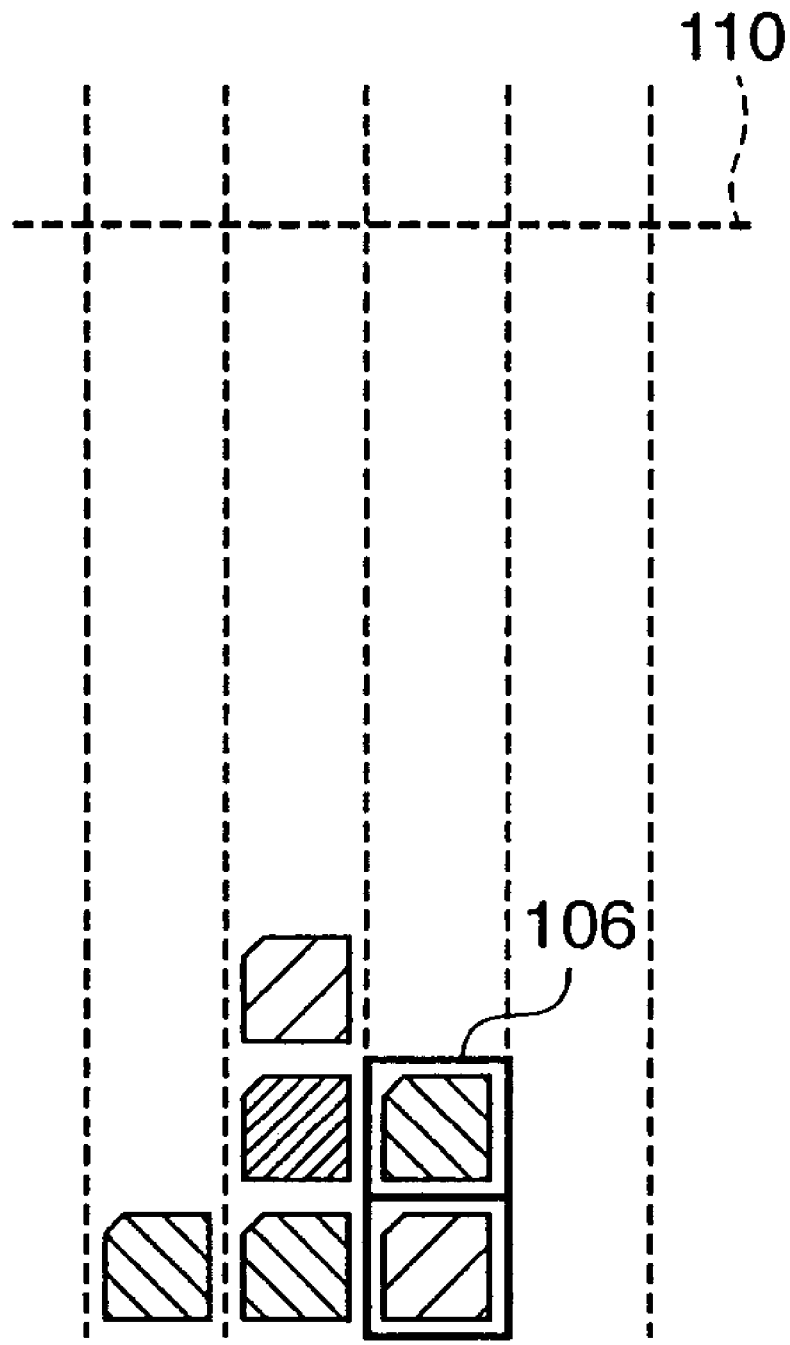

FIGS. 2 and 3 show move examples of the cursor according to this embodiment. The cursor 106 can freely move within the field 100 in accordance with an operation input from the operation unit. As shown in FIG. 3, the cursor 106 can be displayed to surround the stop meteor blocks 105. As a result, meteor blocks to be operated can be designated. According to the present invention, appropriate cursor shape and size can be adopted as long as a predetermined number of (e.g., two) blocks can be consequently designated.

Figure 4:
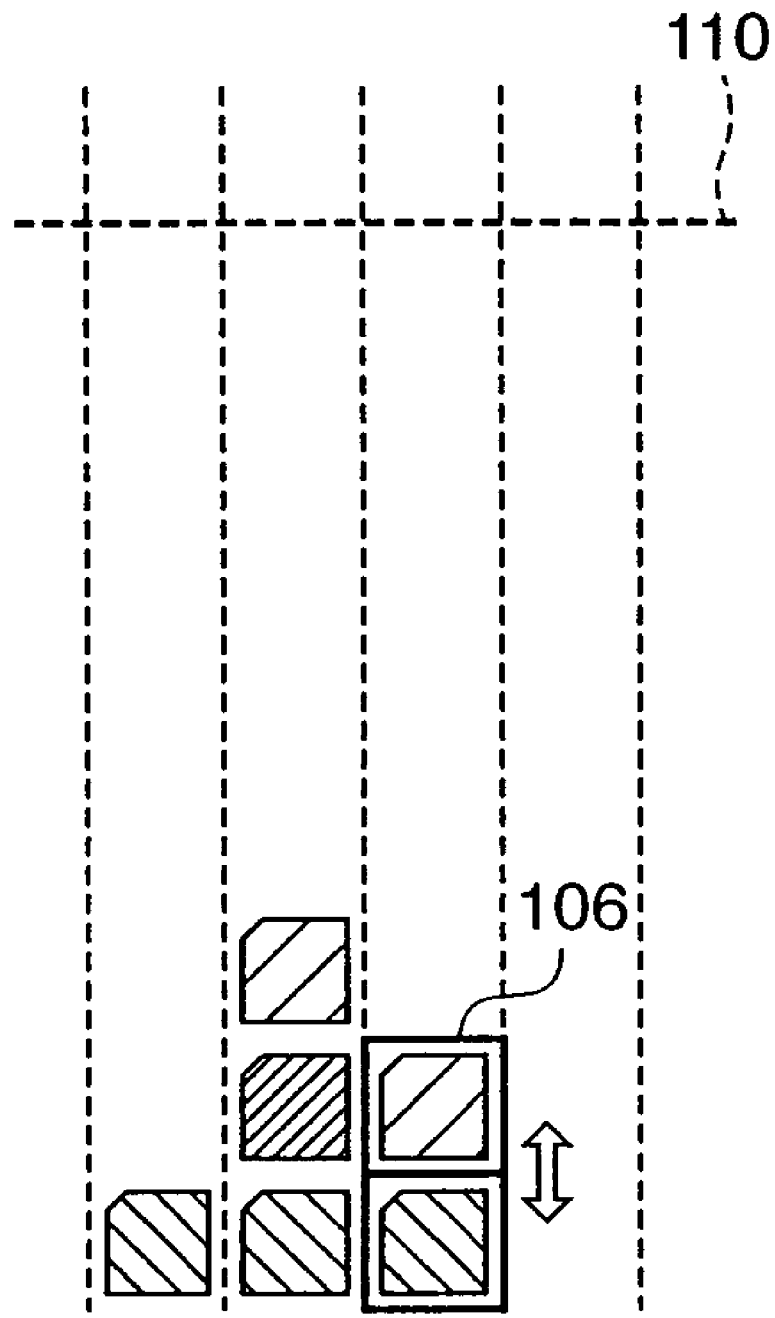
FIG. 4 shows a re-arrange example of meteor blocks according to the embodiment of the present invention.

FIG. 4 shows a re-arrange example of meteor blocks according to this embodiment. When a re-arrange instruction is input from the operation unit to two blocks surrounded by the cursor 106 in FIG. 3, the positions of the two blocks are re-arranged. FIG. 4 shows re-arranged blocks.

Figure 5:
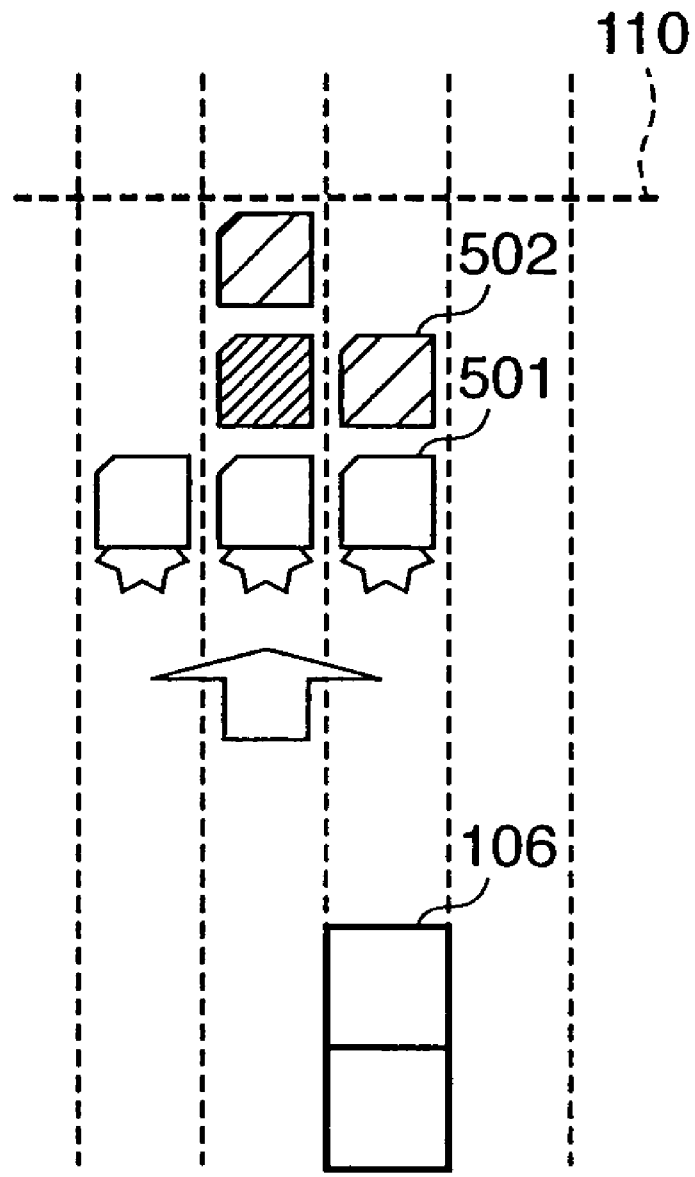
FIG. 5 shows a display example of ignition/launch of meteor blocks according to the embodiment of the present invention.

FIG. 5 shows a display example of ignition/launch of meteor blocks according to this embodiment. When a predetermined number of (e.g., three or more) blocks of the same type line up vertically or horizontally after the blocks are re-arranged, as shown in, e.g., FIG. 4, these blocks meet an ignition/launch condition and are changed to ignition blocks 501. The ignition blocks 501 begin to rise toward the outer space (the upper portion of the display area of the display screen), and are cleared from the field 100 when they rise beyond the line 110 indicating the clear position. When another block 502 is carried on the ignition block 501, the ignition block 501 rises together with the carried block 502. Note that the impelling force of the ignition block 501 may be limited. In this case, the ignition block 501 can rise while carrying other blocks in correspondence with the impelling force. That is, if the ignition block 501 carries too many blocks, since they are heavy, a joint rising condition is not satisfied, and the ignition block 501 cannot rise. That is, a so called unsuccessful launch occurs.

Figure 6:
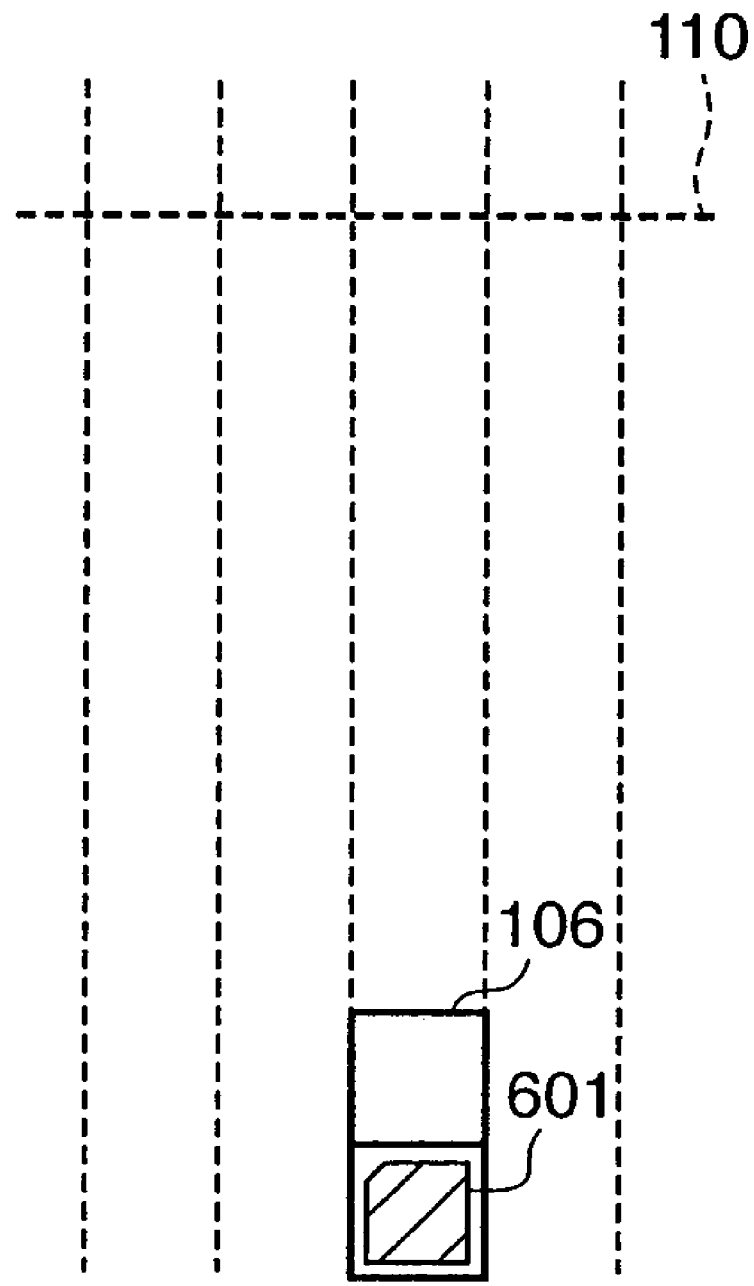
FIG. 6 is a view for explaining the operation when the cursor designates one block in the embodiment of the present invention.

FIG. 6 is a view for explaining the operation when the cursor designates one block in this embodiment. The cursor 106 according to this embodiment can normally accommodate two meteor blocks. However, the cursor 106 can sometimes accommodate only one block.

Figure 7:
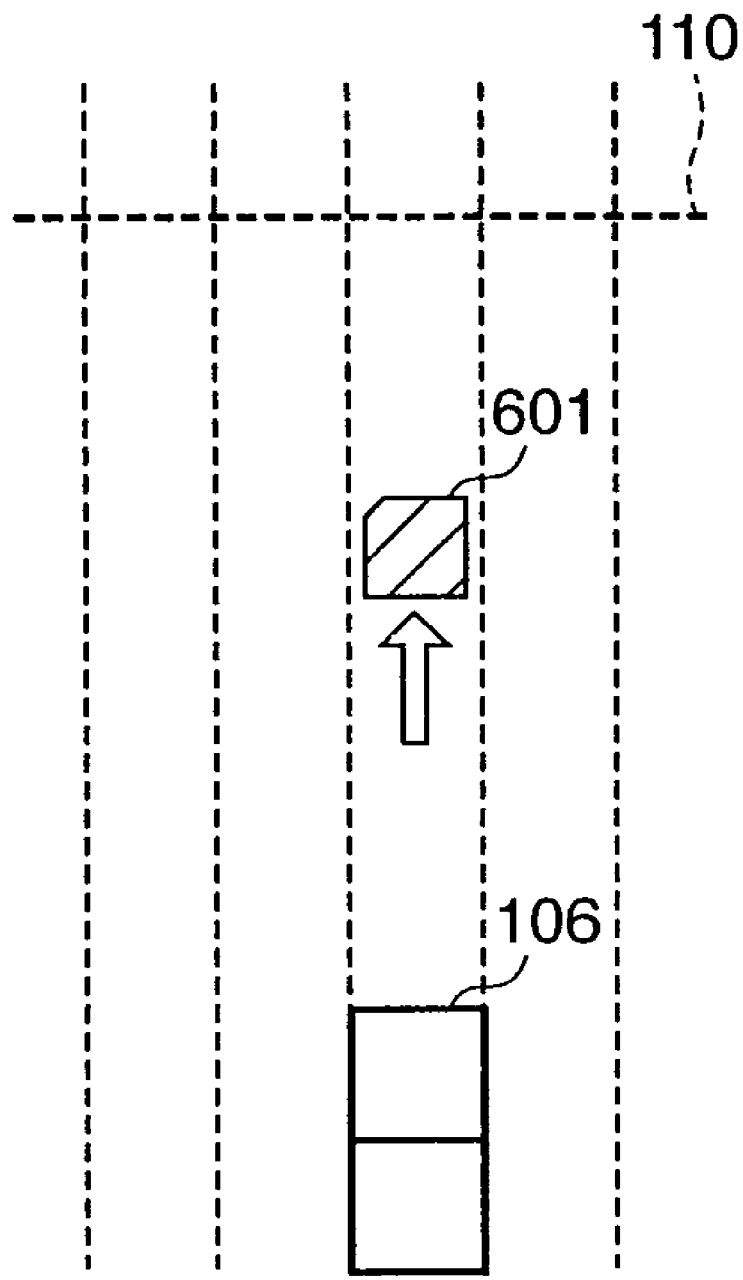
FIG. 7 is a view for explaining a shoot operation in the embodiment of the present invention.

FIG. 7 is a view for explaining a shoot operation in this embodiment. When the player designates a single meteor block 601 using the cursor 106 in FIG. 6, and presses an operation button of the operation unit, the designated meteor block 601 can be launched up to a predetermined position. This operation is called "shoot" in this embodiment.

Figure 8:
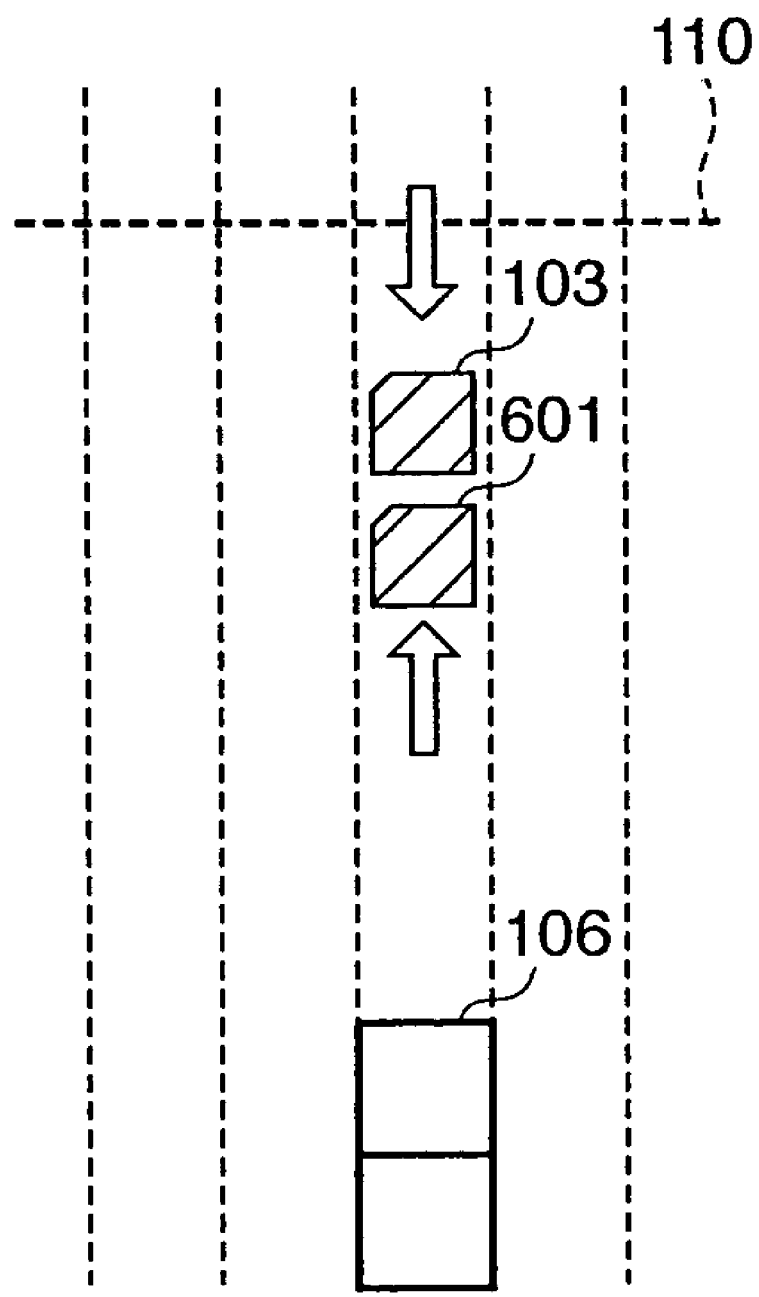
FIGS. 8 and 9 are views for explaining an intercept process of a falling meteor by means of shoot in the embodiment of the present invention.
Figure 9:
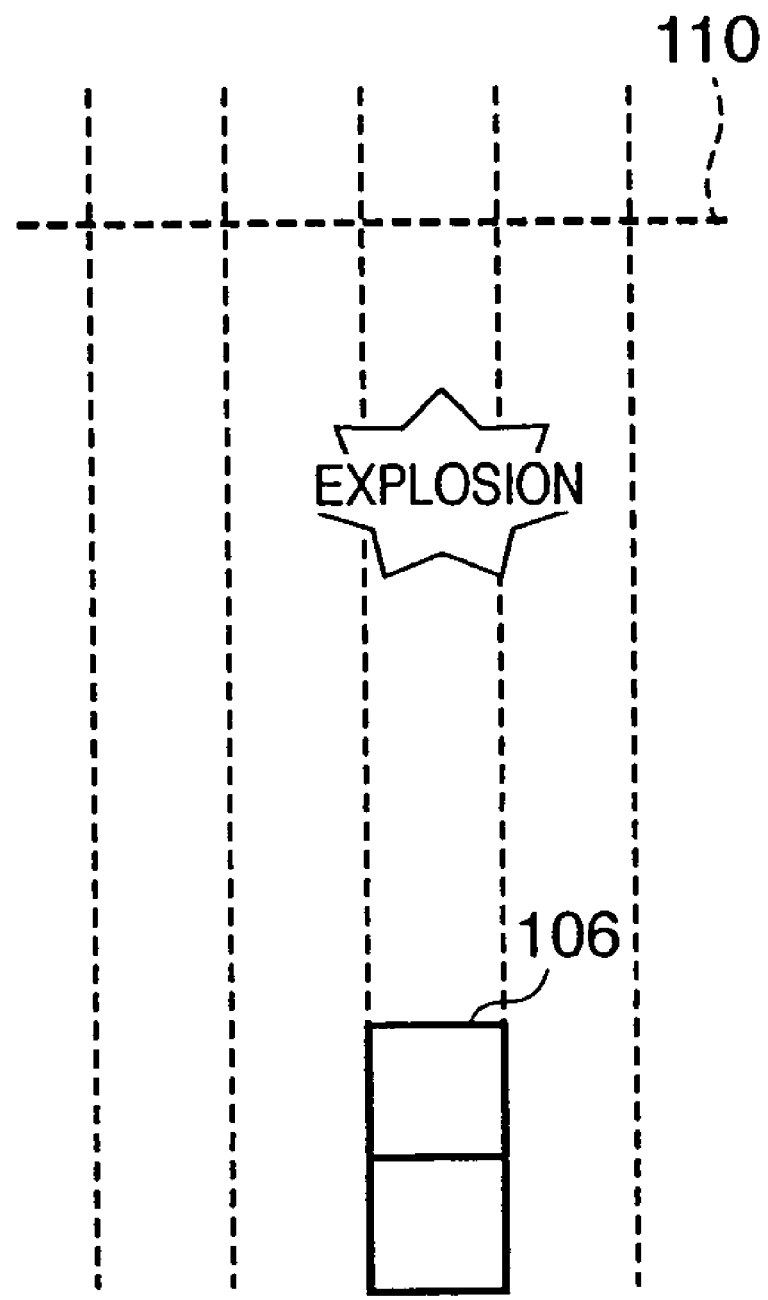

FIGS. 8 and 9 are views for explaining an intercept (collision) process of a falling meteor by means of "shoot" in this embodiment. When the meteor block 601 is shot toward a falling meteor block 103, both the meteor blocks can be exploded, destroyed, and cleared. Note that control may be made to clear the falling meteor block 103 and the meteor block 601 to be shot only when they are of the same type (e.g., the same color or the like). This can increase the difficulty level of the game.

Figure 10:
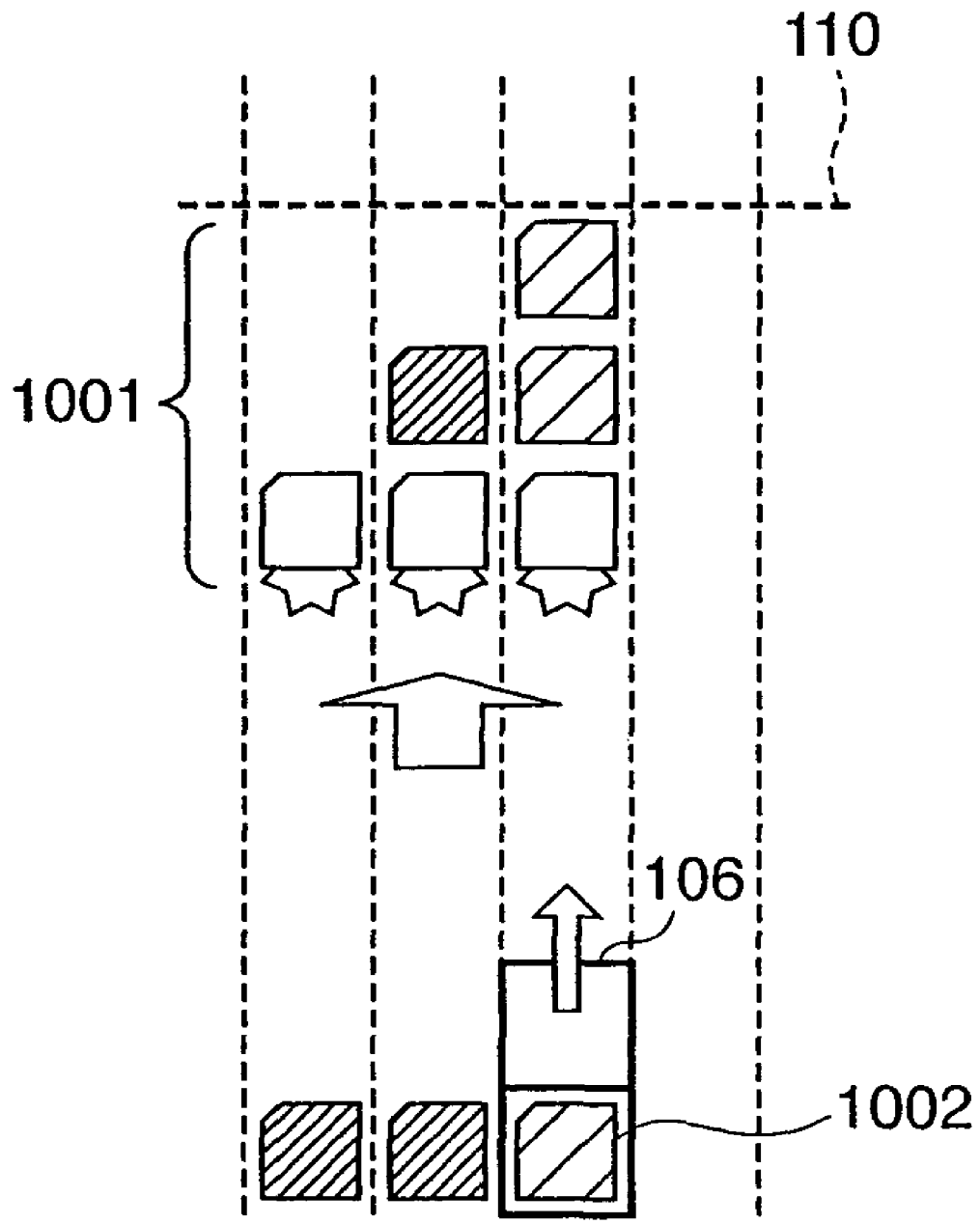
FIGS. 10 and 11 are views for explaining the shoot process for a rising block in the embodiment of the present invention.
Figure 11:
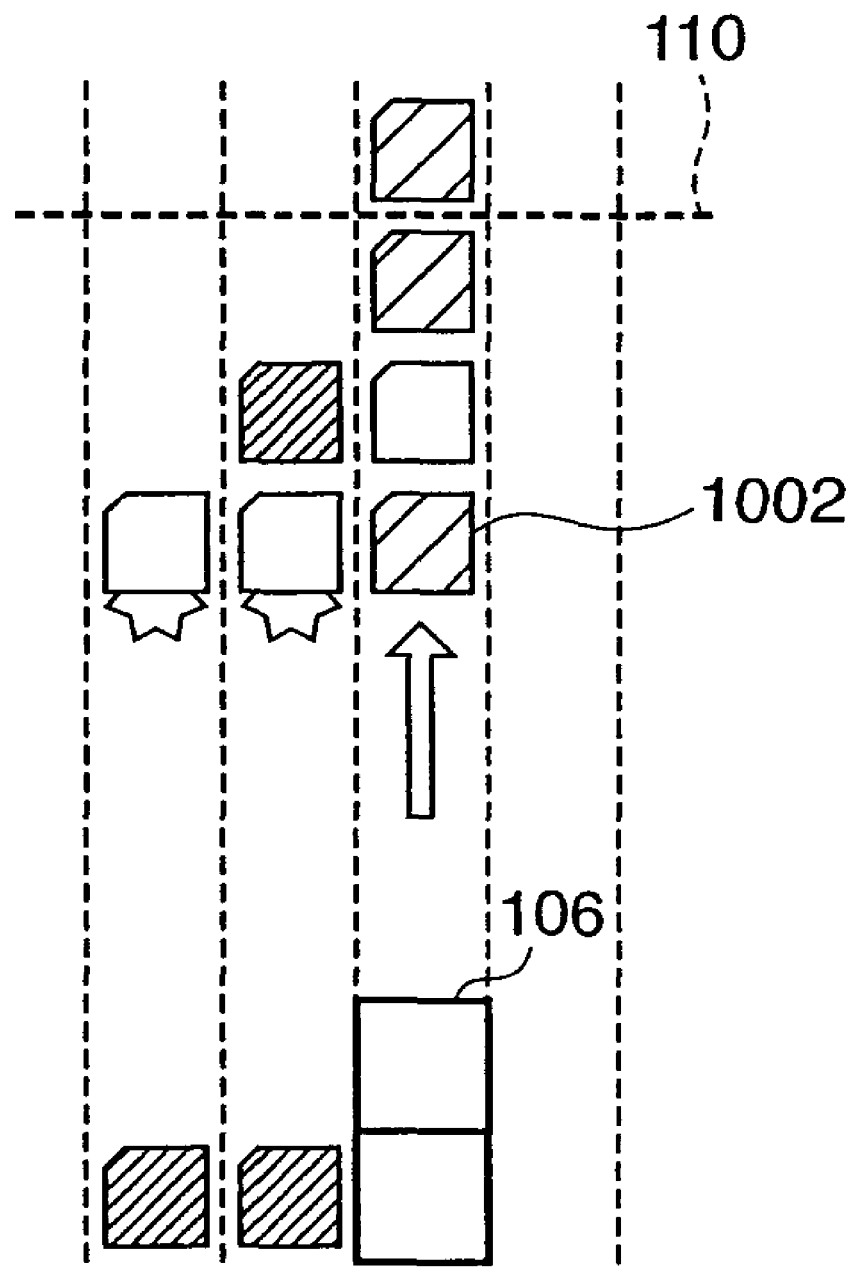

FIGS. 10 and 11 are views for explaining the shoot process for a rising block in this embodiment. Referring to FIG. 10, when a block 1002 located immediately below rising blocks 1001 is shot toward the rising blocks 1001, the shot meteor block 1002 is integrated with the rising block group. If the impelling force of the ignition blocks have an enough margin, the integrated block group rises to the outer space (the upper portion of the display area of the display screen) and are cleared. On the other hand, if the impelling force is insufficient, the block group may be controlled to shift to fall again.

Figure 12:
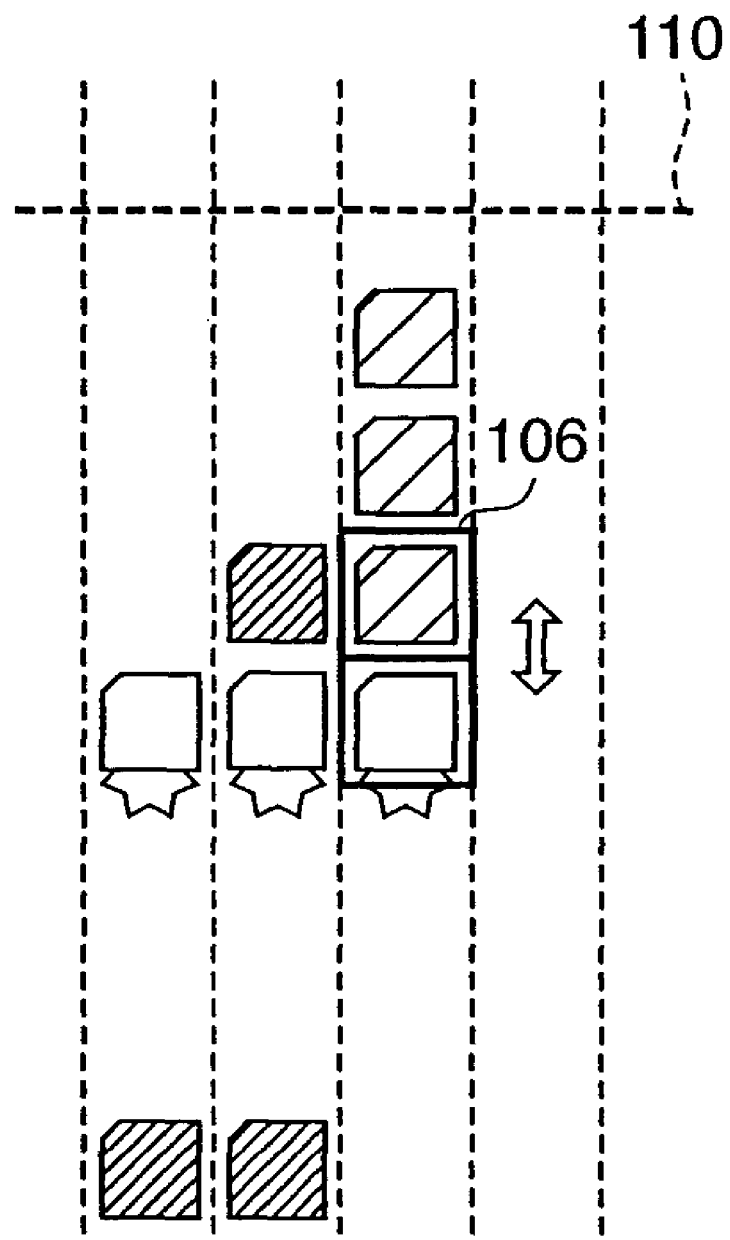
FIGS. 12 and 13 are views for explaining an operation designation process and re-arrange process for rising meteor blocks according to the embodiment of the present invention.
Figure 13:
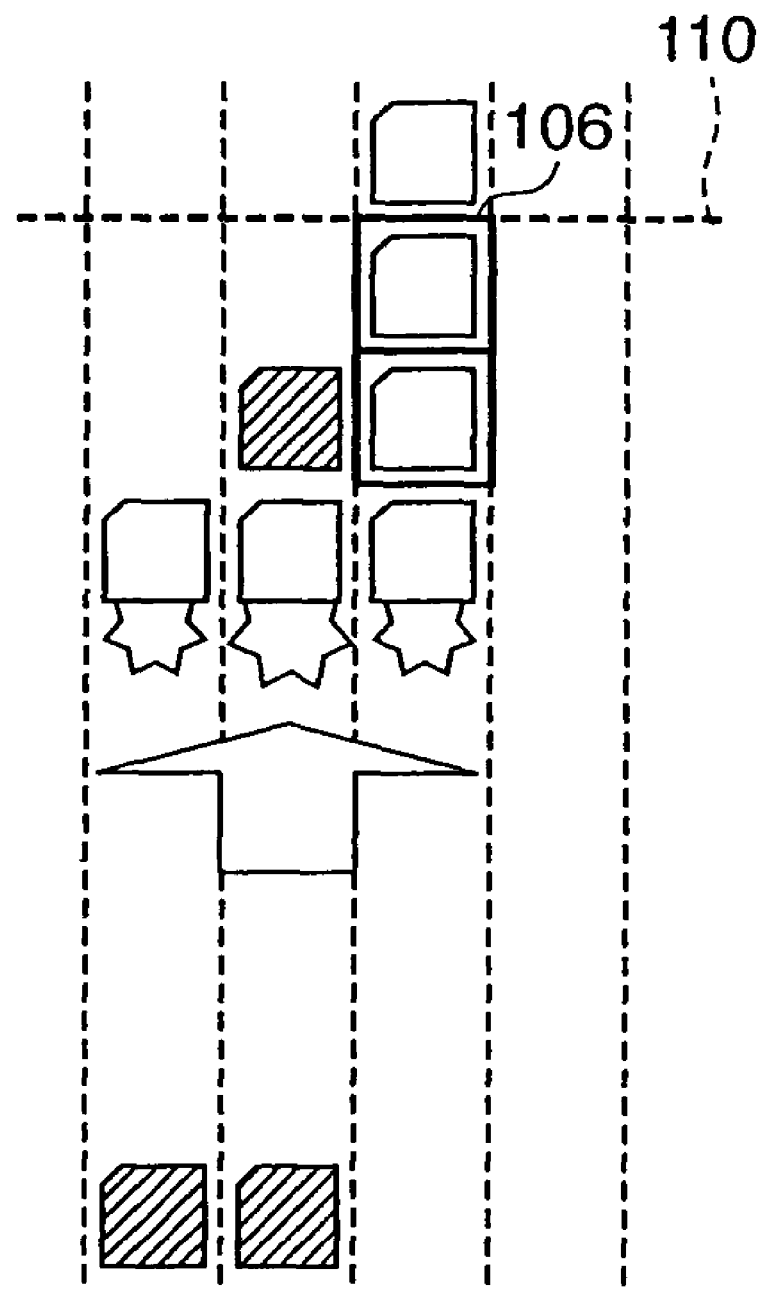

FIGS. 12 and 13 are views for explaining an operation designation process and re-arrange process for rising meteor blocks according to this embodiment. In this embodiment, rising meteor blocks can also be designated as objects to be re-arranged. As shown in FIG. 12, when the player moves the cursor 106 and designates two rising blocks, he or she can designate the two blocks as objects to be re-arranged. In this state, when the player operates a re-arrange button, the blocks are re-arranged, as shown in FIG. 13. In this case, if a predetermined number or more of blocks of the same type line up in the rising blocks, they are also changed to ignition blocks. When the number of ignition blocks increases in the rising blocks, the total impelling force also increases, and the rising velocity increases. Hence, these blocks can easily reach the outer space (the upper portion of the display area of the display screen).

Figure 14:
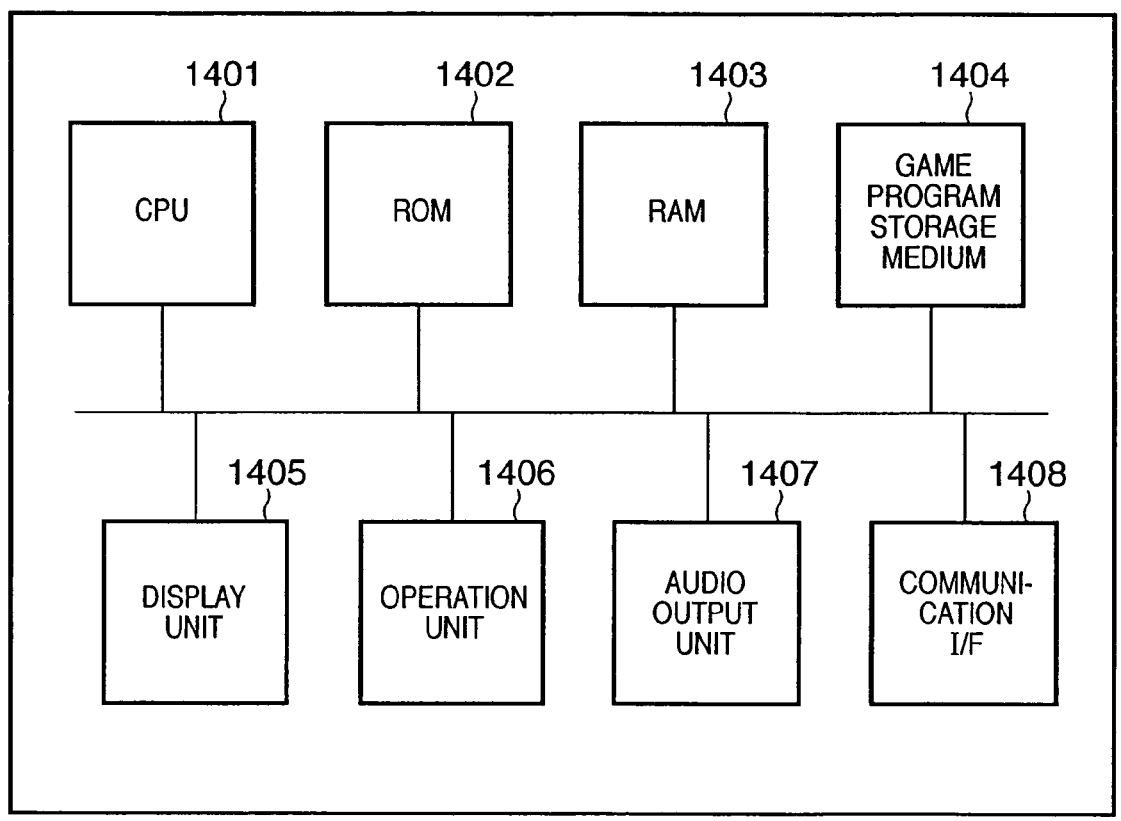
FIG. 14 is a block diagram showing an example of a game apparatus according to the embodiment of the present invention.

FIG. 14 is a block diagram showing an example of a game apparatus according to this embodiment. A CPU 1401 is a central processing unit which systematically controls the overall game apparatus. A ROM 1402 is a storage circuit for storing basic programs such as an OS and the like. A RAM 1403 is a storage circuit for storing data associated with the game. A game program storage medium 1404 is a storage medium such as a mask ROM, flash memory, optical disk, or the like, which stores a game program. A display unit 1405 is a liquid crystal display device for displaying the contents of the game. An operation unit 1406 includes a plurality of buttons and keys, and outputs, to the CPU 1401, operation input signals used to move the cursor 106 upward/downward or to the right or left, to re-arrange meteor blocks designated by the cursor 106, and to shoot a meteor block designated by the cursor 106. An audio output unit 1407 includes an audio output circuit and loudspeaker which are used to audibly output music data and effect sounds stored in the storage medium 1404. A communication interface 1408 is a communication circuit which connects an external PC or the like such as another game apparatus or the like and exchanges data.

When the CPU 1401 manipulates various data in the following description, it reads out the data from a storage unit (RAM 1403 or the like), appropriately processes the readout data, and writes that data in the storage unit, needless to say.

Figure 15:
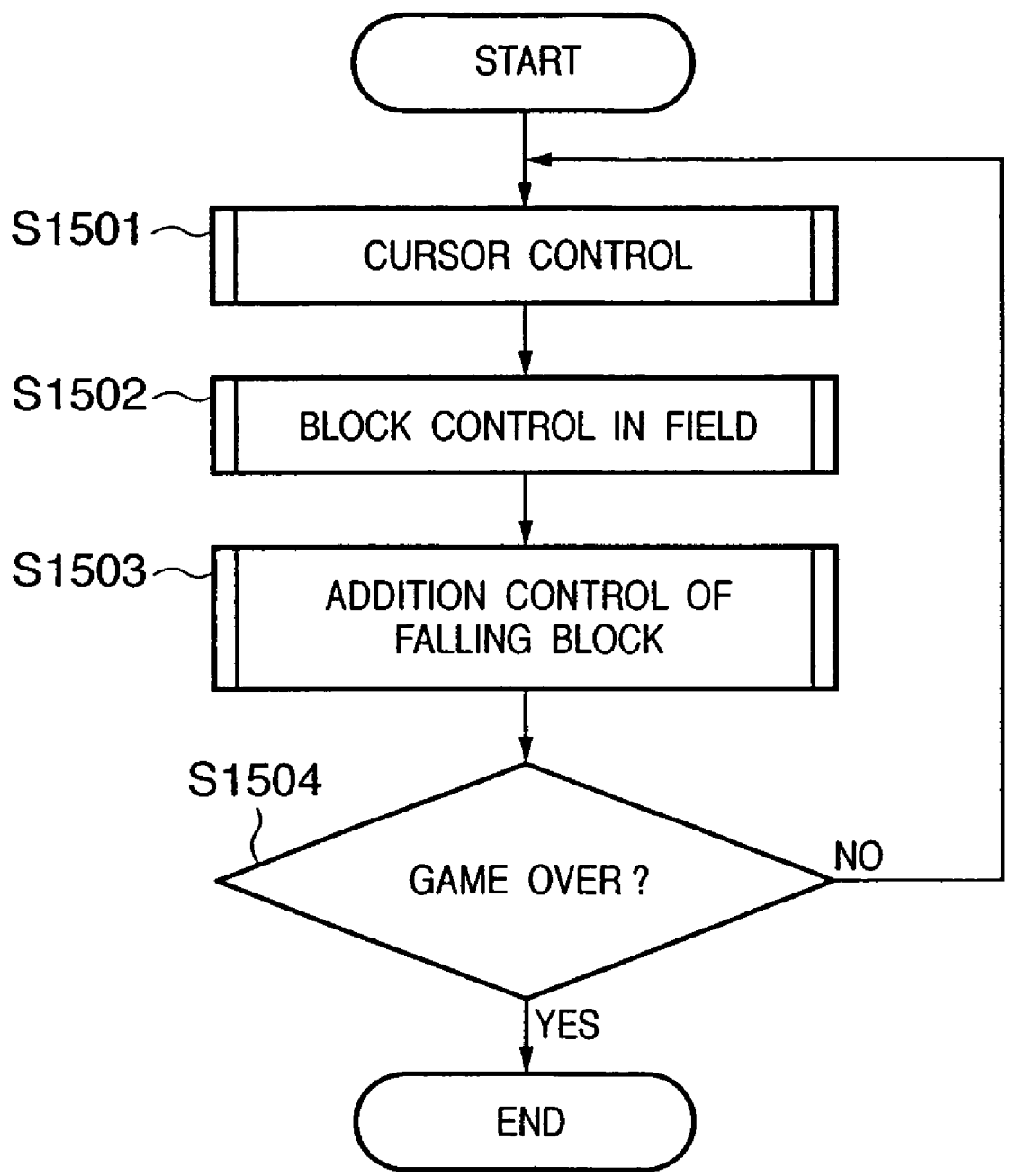
FIG. 15 is a flowchart showing an example of the main sequence of the game program according to the embodiment of the present invention.

FIG. 15 is a flowchart showing an example of the main sequence of the game program according to this embodiment.

In step S1501, the CPU 1401 performs display control of the cursor 106. For example, the CPU 1401 stores and manages display position data indicating the current display position of the cursor 106 in the RAM 1403. In this example, the field 100 is divided into 15 grids in the horizontal direction and 10 grids in the vertical direction, and one grid can accommodate one meteor block.

Also, in this example, the cursor 106 has two grids. Of the display position data of the cursor, coordinate data can be expressed by [Cursor_X, Cursor_Y] with reference to the lower grid of the cursor. In consideration of the size of the field 100, the range that the coordinate data can assume is defined by 0<Cursor_X<16 and 0<Cursor_Y<11. For example, when a grid which is located at the leftmost and uppermost position of the field 100 is defined by [1, 1] and a grid which is located at the rightmost and lowermost position is defined by [15, 10], if Cursor=[3, 4], the lower grid of the cursor 106 is displayed at the third leftmost and fourth uppermost position. Of course, the upper grid of the cursor 106 is displayed at the third leftmost and third uppermost position.

If the right key is operated on the operation unit 1406, the CPU 1401 adds 1 to the value of Cursor_X. If the down key is operated, the CPU 1401 adds 1 to the value of Cursor_Y. If the left or up key is operated, the CPU 1401 subtracts 1 from Cursor_X or Cursor_Y. This is merely an example.

In step S1502, the CPU 1401 controls the falling blocks 101 to 104, stop blocks 105, and rising blocks 1001 (ignition blocks 501, carried blocks 502, and shoot block 601) in the field 100. As for these blocks, the CPU 1401 stores and manages, in the RAM 1403, display position data, color data indicating types of colors such as red, blue, green, and the like, impelling force data indicating impelling forces, type data indicating types of movements such as falling, rising, stop, and the like, and so forth.

For example, as for the falling blocks 101 to 104, the CPU 1401 changes data in a falling direction as the game progresses until they reach falling stop positions (e.g., the bottom of the field, positions above other stop blocks, and the like).

The CPU 1401 checks if the stop blocks 105 satisfy rising start conditions such as the aforementioned joint rising condition and the like (i.e., a condition to ignite and launch blocks). If the blocks that satisfy the conditions are found, the CPU 1401 changes data of stop blocks satisfying the rising start conditions to express the rising block (especially, the ignition blocks 501) and their display position data to rise according to the impelling forces of the blocks. As for a stop blocks carried on the ignition blocks 501, the CPU 1401 changes data to express the carried block 502. Of these rising blocks, if rising blocks which have reached the clear position are found, the display of the blocks is cleared. When the stop block 105 satisfies a shoot condition (the operation of the operation button when the cursor accommodates a stop block fewer than its maximum number of blocks to be accommodated), the CPU 1401 changes the type data of that stop block to express a shoot block 601 and writes it in the RAM 1403, and changes the display position data to raise the block so as not to reach the clear position.

In step S1503, the CPU 1401 generates data such as display positions, colors, and the like of a new falling block, stores them in the RAM 1403, and performs display control to make that block begin to fall.

The CPU 1401 checks in step S1504 if the game is over. If meteor blocks are piled up in the vertical direction of the field 100 and there is no room for falling new meteor blocks, the CPU 1401 determines that the game is over. Otherwise, the flow returns to step S1501.

Figure 16:
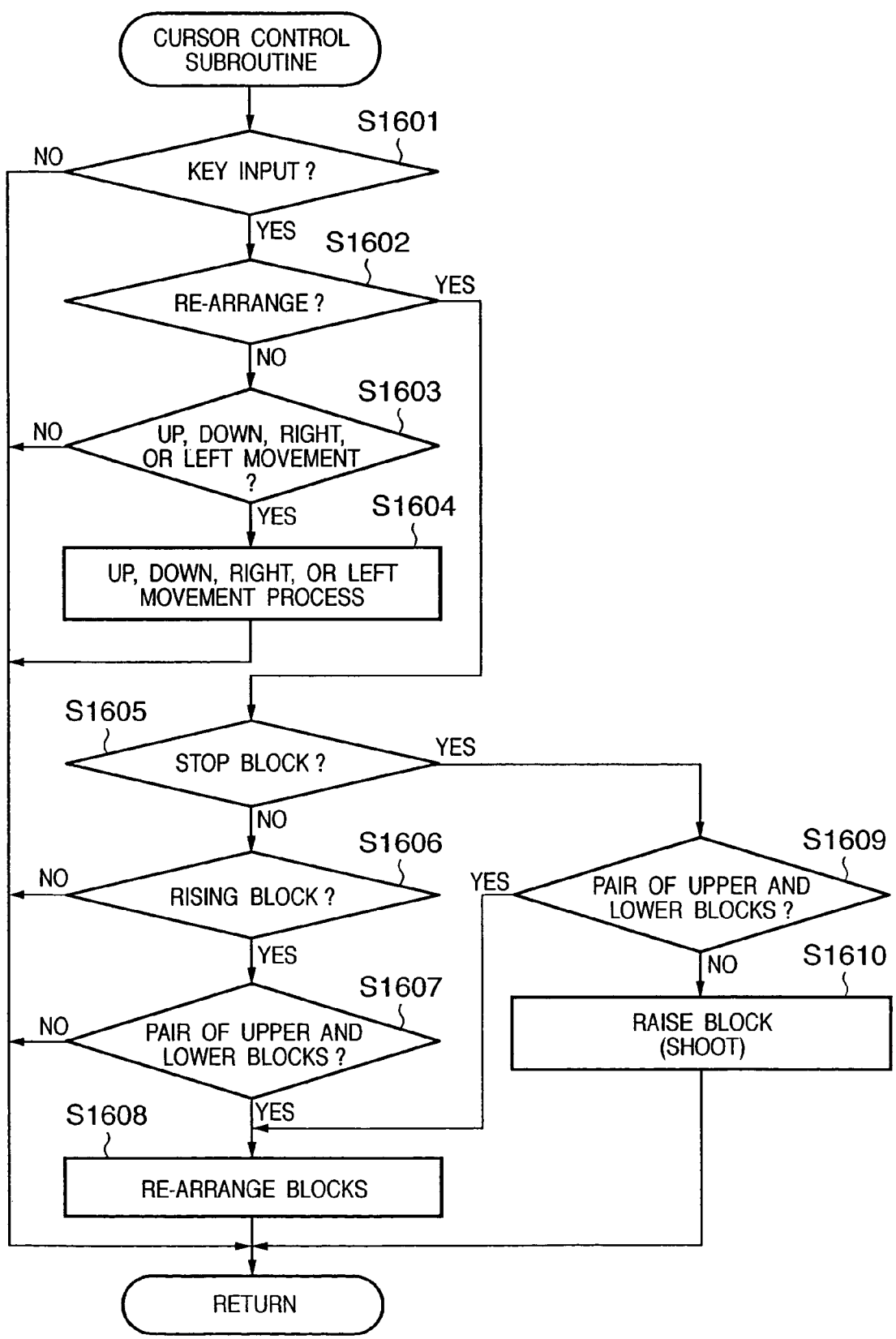
FIG. 16 is a flowchart showing an example of a cursor control subroutine according to the embodiment of the present invention.

FIG. 16 is a flowchart showing an example of a cursor control subroutine according to this embodiment. This subroutine corresponds to step S1501 described above.

The CPU 1401 checks in step S1601 if a key input from the operation unit 1406 is detected. If a key input is detected, the flow advances to step S1602; otherwise, the control exits this subroutine.

The CPU 1401 checks in step S1602 if the key input signal from the operation unit 1406 indicates an operation instruction that instructs to re-arrange. If the key input signal is a re-arrange instruction, the flow jumps to step S1605; otherwise, the flow advances to step S1603.

The CPU 1401 checks in step S1603 if the key input signal from the operation unit 1406 indicates an operation instruction that instructs to one of left, right, up, and down movements. If the key input signal is a move instruction, the flow advances to step S1604; otherwise, the control exits this subroutine and returns to the main routine.

In step S1604, the CPU 1401 performs display control to move the cursor 106 upward or downward or to the right or left in accordance with the move instruction from the operation unit 1406. For example, the CPU 1401 reads out variables indicating the display position data, changes their values, and stores them in the RAM 1403 again, as described above. The CPU 1401 reads out the display position data, and transmits a display command of the cursor 106 to the display unit 1405. With this command, the cursor 106 is displayed as if it were moving.

The CPU 1401 checks in step S1605 if the cursor 106 designates a stop block or blocks 105. For example, the CPU 1401 reads out the display position data of the cursor 106 and that of each stop block 105 from the RAM 1403, and compares them to check if they match. If the two display position data match, the cursor 106 is displayed to surround an arbitrary stop block or blocks 105. If the cursor 106 designates the stop block or blocks 105, the flow advances to step S1609; otherwise, the flow advances to step S1606.

The CPU 1401 checks in step S1606 if the cursor 106 designates a rising block or blocks 1001. For example, the CPU 1401 reads out the display position data of the cursor 106 and that of each rising block 1001 from the RAM 1403, and compares them to check if they match. The rising blocks include not only the ignition blocks 501 which are ignited and launched but also actually rising blocks such as the carried block 501 which is carried on the ignition block and the like (in some cases, a block which begins to fall after rising or the like is included). If the two display position data match, the cursor 106 is displayed to surround an arbitrary rising block or blocks 1001. If the cursor 106 designates a rising block or blocks 1001, the flow advances to step S1607; otherwise, the flow returns to the main routine.

The CPU 1401 checks in step S1607 if the cursor 106 designates two blocks. For example, the CPU 1401 reads out the display position data of the cursor 106 and those of the rising blocks 1001 from the RAM 1403, and compares them to check if the rising block 1001 which matches the upper grid of the cursor 106 and the rising block 1001 which matches the lower grid of the cursor 106 are present. If such rising blocks are present, two meteor blocks are accommodated and displayed in the two grids of the cursor 106. If the two blocks are designated, the flow advances to step S1608; otherwise, the flow returns to the main routine.

In step S1608, the CPU 1401 re-arranges the positions of the two designated blocks. For example, the CPU 1401 reads out the display position data (especially, coordinate data) of the two designated blocks from the RAM 1403, swaps them, and stores the swapped display position data in the RAM 1403 again. The CPU 1401 reads out the changed display position data from the RAM 1403 and outputs a rendering command to the display unit 1405. As a result, the display unit 1405 displays the two blocks as if their positions were re-arranged. After that, the flow returns to the main routine.

In case of the stop blocks 105, the CPU 1401 checks in step S1609 if the cursor 106 designates two blocks. If the two blocks are designated, the flow advances to step S1608; otherwise, the flow advances to step S1610.

In step S1610, the CPU 1401 shoot displays the single stop block 501 which is designated by the cursor 106. For example, the CPU 1401 changes the values of the display position data of the single stop block 501 to raise it. The CPU 1401 sets the value of the impelling force to a value which makes the block stall and fall again before the block reaches the clear position.

Figure 17:
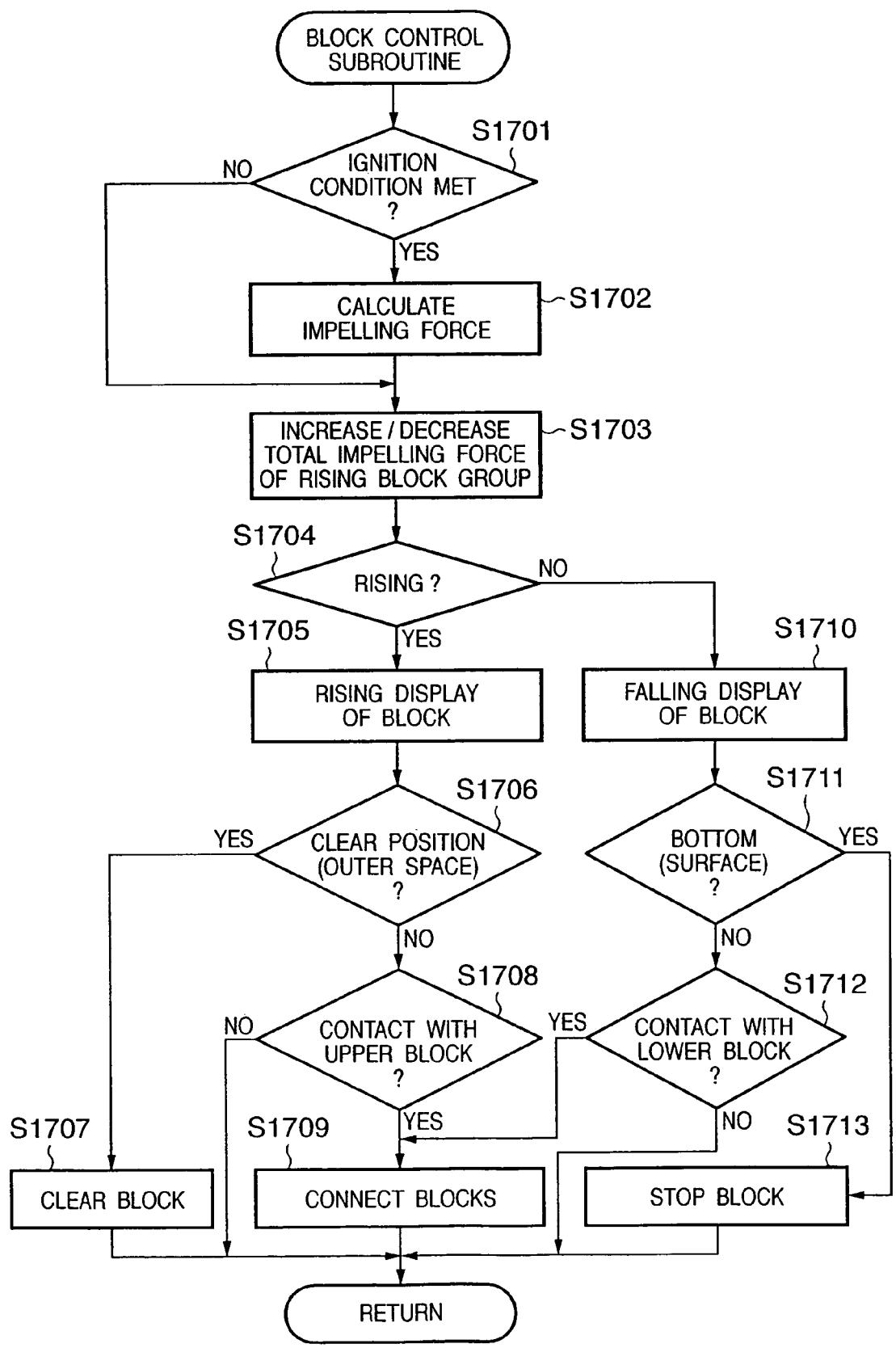
FIG. 17 is a flowchart showing an example of a block control process according to the embodiment of the present invention.

FIG. 17 is a flowchart showing an example of a block control process according to this embodiment.

In step S1701, the CPU 1401 searches blocks in the field 100 to check if blocks that meet the ignition condition are present. For example, the CPU 1401 reads out the display position data and color data of each block located in the field, and checks if a plurality of blocks (in this example, three or more blocks) of the same type line up vertically or horizontally. If the blocks that meet the ignition condition are found, the flow advances to step S1702; otherwise, the flow jumps to step S1703.

In step S1702, the CPU 1401 calculates the impelling forces of the blocks that meet the ignition condition. For example, in case of the n th ignition of a rising block, the impelling force per ignition block can be calculated by $n \times Px$ (where Px is a default impelling force of an ignition block). As can be seen from this formula, if the number of times of ignition increases in a given ignition block, the impelling force increases. Even after a given rising block group begins to rise, when blocks are re-arranged successively, the number of times of ignition can be increased to the second ignition, third ignition, . . . , n th ignition, and the impelling force can increase dramatically. Note that an impelling force Py may be provided to a carried block. Note that these values are parameters on the game, and do not perfectly follow the physical laws. The impelling forces calculated in this way are stored in the RAM 1403.

In step S1703, the CPU 1401 calculates an increment/decrement of the total impelling force for a rising block group including the ignition block 501 that satisfies the ignition condition, and the carried block 502 carried on that block 501. The impelling force of the ignition block 501 can be expressed as a function of time, and is changed to decrease in inverse proportion to an elapsed time. For this reason, the rising acceleration of the rising block becomes smaller, and the rising velocity also gradually slows down. As a result of rearranging blocks in the rising block group, if a new block that satisfies the ignition condition is found, the impelling force increases. The calculated value of the impelling force, and the values of the acceleration, rising velocity, and the like calculated based on the impelling force are also stored in the RAM 1403.

For example, a total impelling force P(t) is given by n×P×i/t+Py×j. t is an elapsed time, which normally has a progress frame of the game as a unit. The progress frame is a periodic rewrite unit of the display screen. i is the number of ignition blocks. j is the number of carried blocks. Note that the carried block may also be multiplied by the n th ignition coefficient n. As can be seen from this formula, the impelling force P(t) decreases along with an elapse of time t. In this case, P(t) is directly divided by t. However, any other formulas may be used as long as the impelling force of the ignition block decreases along with an elapse of time.

A rising acceleration a can be calculated by P(t)/(m(i+j)), where m is a parameter indicating a mass per block. A rising velocity v is given by (a g)t (strictly speaking, a must be integrated, but a simple formula is adopted because of a game), where g is the gravitational acceleration. A final rising distance s is expressed by 0.5(a g)t2 (strictly speaking, since the rising acceleration a itself is a function of t, it must be calculated by integration, but a simple formula is adopted because of a game).

The CPU 1401 checks in step S1704 if the rising block group satisfies a rising condition. For example, the CPU 1401 reads out the rising velocity v of the overall rising block group from the RAM 1403, and determines that the rising block group rises if the readout value is positive. If the rising block group rises, the flow advances to step S1705; otherwise, the flow advances to step S1710.

In step S1705, the CPU 1401 displays the rising block group to rise. For example, the CPU 1401 reads out the rising velocity data v or acceleration data a from the RAM 1403, substitutes it in the rising distance calculation formula to calculate the rising distance s, and adds the calculated distance s to the display position data of each block, thus reflecting the calculated distance s in the display position data. The reflected display position data are stored in the RAM 1403 again.

The CPU 1401 checks in step S1706 if the rising blocks have reached the clear position 110. For example, the CPU 1401 reads out the display position data of each rising block and compares the readout data with that of the clear position. If the ordinate value of the rising block exceeds that of the clear position, it is determined that the clear position has been reached. If the clear position has been reached, the flow advances to step S1707; otherwise, the flow advances to step S1708.

In step S1707, the CPU 1401 changes display data to clear display of the block pair that has reached the clear position 110. After that, the control exits this subroutine, and returns to the main routine.

The CPU 1401 checks in step S1708 if the rising block contacts another block located at its upper position. For example, the CPU 1401 reads out the display position data of the rising block from the RAM 1403, and searches for and extracts another block having a coordinate position higher by one than that of the block of interest as display position data. If the other block is found by search, it is determined that the rising block contacts the other block. If the rising block contacts the other block, the flow advances to step S1709; otherwise, the flow returns to the main routine.

In step S1710, the CPU 1401 displays each rising block, which is determined not to be rising, to fall. For example, the CPU 1401 reads out the velocity data, acceleration data, and the like of each rising block, which is determined not to be rising, and substitutes them in the distance calculation formula to calculate a falling distance. Then, the CPU 1401 reads out the display position data of the rising block which is determined not to be rising, changes the display position data to lower a display position by the falling distance, and stores the changed display position data in the RAM 1403. Since the changed display position data indicates a position lower than the display position data before change, the display unit 1405 displays the rising block as if it were falling.

The CPU 1401 checks in step S1711 if the falling block contacts the bottom of the field 100. For example, the CPU 1401 reads out the display position data of the block of interest from the RAM 1403, and checks if its ordinate value indicates the bottom (10 in the example of FIG. 1). If the block lands on the bottom (surface of earth), the flow jumps to step S1713; otherwise, the flow advances to step S1712.

The CPU 1401 checks in step S1712 if the falling block contacts another block located at its lower position. For example, the CPU 1401 reads out the display position data of the falling block from the RAM 1403, and searches for another block having a coordinate position lower by one than that of the block of interest as display position data. If the other block is found by search, it is determined that the falling block contacts the other block. If the falling block contacts the other block, the flow advances to step S1709; otherwise, the flow returns to the main routine.

In step S1713, the CPU 1401 displays the block which contacts the bottom and a block carried on that block to stop their movement. For example, the CPU 1401 reads out the velocity data of the block from the RAM 1403, and changes and stores the data to set zero velocity. Alternatively, the CPU 1401 changes data indicating the block type to express a stop block and stores the changed data in the RAM 1403.

Figure 18:
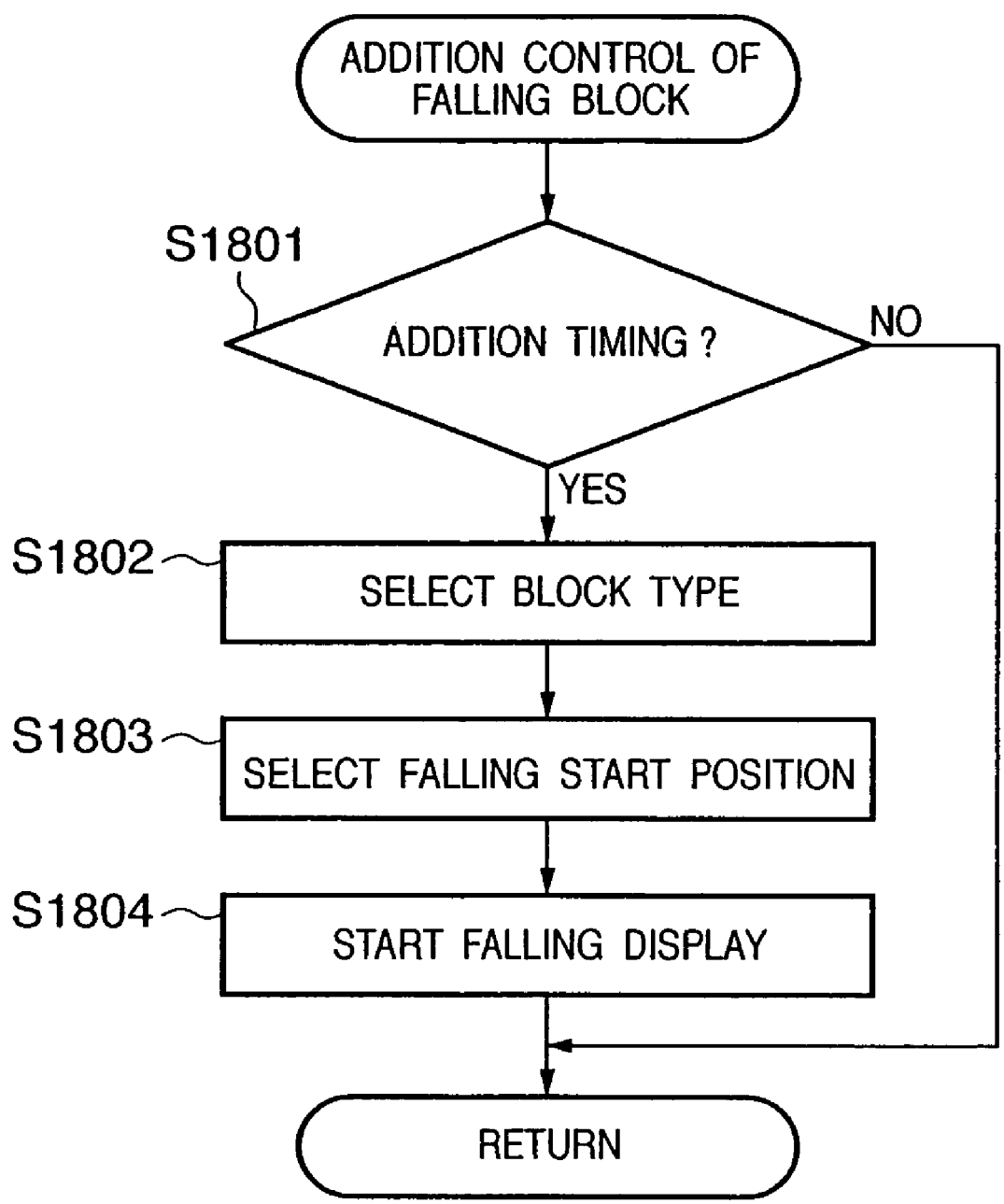
FIG. 18 is a flowchart showing an example of block addition control according to the embodiment of the present invention.

FIG. 18 is a flowchart showing an example of block addition control according to this embodiment. This flowchart corresponds to step S1503.

The CPU 1401 checks in step S1801 if an addition timing is reached. For example, if periodic addition timings are adopted, the CPU 1401 reads out time data from a timer, and checks if the periodic addition timing is reached. Note that the periodic addition timings need not always be adopted, and the interval from when a given falling block is added until a new falling block is added may be controlled to gradually become shorter along with the progress of the game. Also, the CPU 1401 may control the interval to several times (e.g., eight times) the normal one while a specific button of the operation unit 1406 is pressed. Such process is called time acceleration. As a result of checking, if the addition timing is reached, the flow advances to step S1802; otherwise, the flow returns to the main routine.

In step S1802, the CPU 1401 selects the type of a new falling block. For example, the CPU 1401 determines type data (e.g., color or the like) using a random number function, and stores the determined data in the RAM 1403 as the type data of the block of interest.

In step S1803, the CPU 1401 selects a falling start position of the new falling block, generates display position data including the falling start position as a display position, and stores the generated data in the RAM 1403. The ordinate value of the falling start position indicates the uppermost portion of the field, but its abscissa value is determined by a random number function.

In step S1804, the CPU 1401 displays the new falling block at the falling start position, and exits this subroutine.

Figure 19:
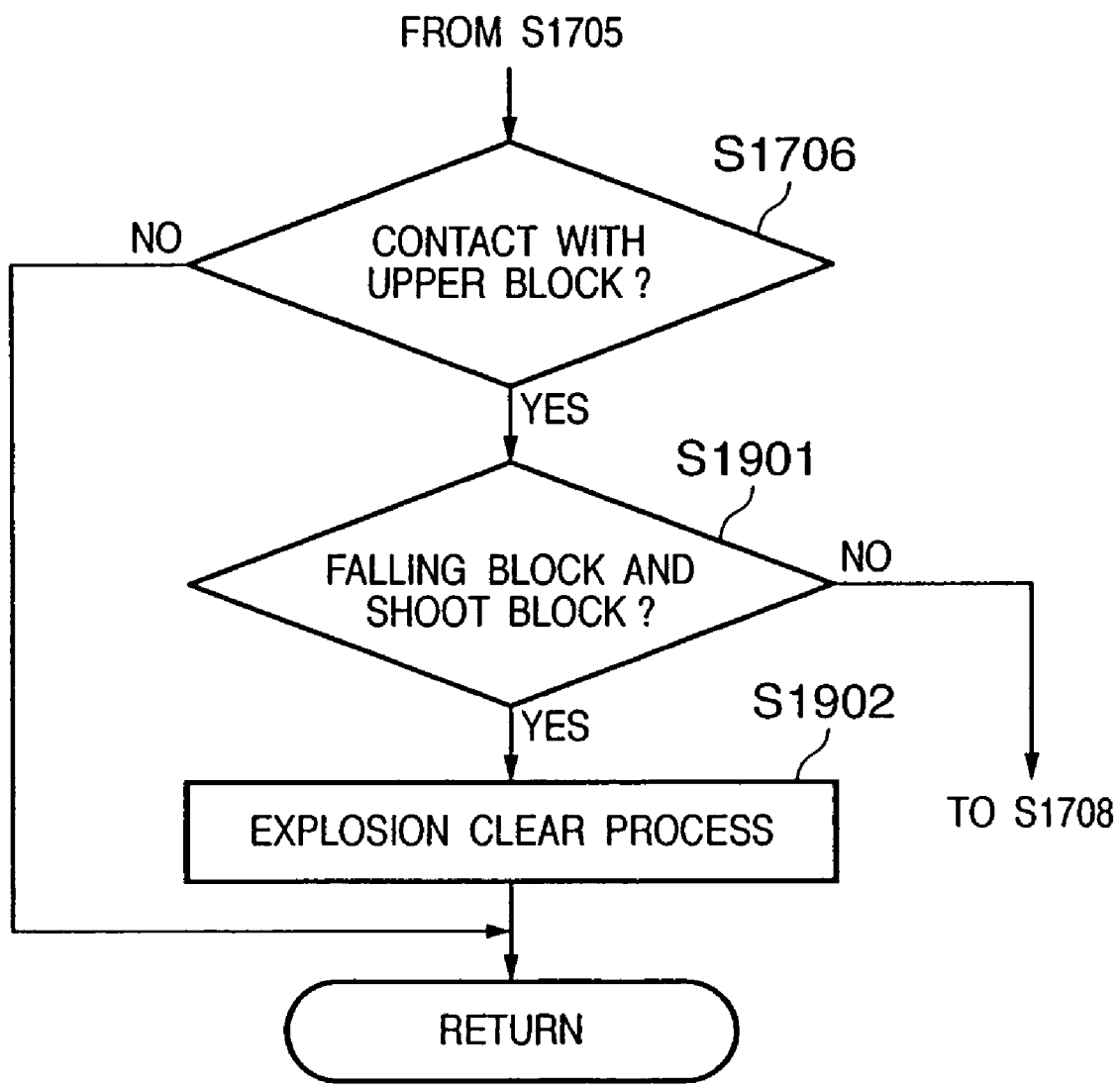
FIG. 19 is a flowchart showing an example of the intercept process by a shoot block according to the embodiment of the present invention.

FIG. 19 is a flowchart showing an example of the intercept (collision) process by a shoot block according to this embodiment. In this flowchart, some steps of the flowchart in FIG. 17 are modified. To avoid a repetitive description, the modified steps will be mainly explained.

If it is determined in step S1706 above that the rising block contacts an upper block, the flow advances to step S1901. The CPU 1401 checks in step S1901 if the two contacting blocks are the falling block 103 and shoot block 601. More specifically, the CPU 1401 reads out the type data of both the blocks, and checks if the rising block is the shoot block 601, and the upper block is the falling block 103. If the two contacting blocks are the falling block 103 and shoot block 601, the flow advances to step S1902; otherwise, the flow advances to step S1708. In step S1902, the CPU 1401 explodes and clears both the blocks. For example, display that expresses explosion is made to clear display of the blocks.

As described above, according to the embodiment of the present invention, the player can operate the meteor blocks 105 which stop falling and rising meteor blocks (including blocks which are falling after rising) 1001 in place of newly falling meteor blocks 101 to 104. Hence, since objects to be operated can be freely selected unlike the conventional "falling block games" in which only newly falling blocks are forcibly designated as objects to be operated, the player can experience novel operability.

It is a very fresh idea that re-arranged objects are cleared after they are raised and cleared when they reach the outer space in place of being cleared directly, and the player can feel exhilaration unlike the conventional "falling block games".

Since the player can designate and operate not only the stop blocks 105 but also the rising blocks 1001, options of objects to be operated can be broadened, and objects can be combined more intricately.

If the number of designated stop blocks 601 is smaller than a predetermined value, the rising range is limited partway, the difficulty level of the game can be maintained to be appropriate one.

When the shoot block 601 is launched toward a falling object, not only the falling block 103 is intercepted (collided) but also the rising shoot block 103 is cleared. Hence, the number of clear conditions increases, and the player can enjoy more elaborate clear conditions than the conventional games.

When a plurality of blocks 1001 are rising, and the shoot block 1002 rises from below these blocks and collides against them, the shoot block 1002 unites with the rising object, and the shoot block 1002 can also be cleared, thus counterchanging the clearing conditions. Since the clear conditions are counterchanged, the strategy becomes important, and the player can experience the difficulty and a sense of mastery enjoy unlike in the conventional games.

Not only the ignition blocks 501 but also carried blocks 502 carried on these blocks are raised together if they meet the joint rising condition, and objects which are piled up can be cleared at once. Hence, the player can experience the best part of clearing.

When the ignition blocks 501 which meet the ignition/launch condition and the carried blocks 502 carried on them do not meet the joint rising condition, the CPU 1401 performs display control to inhibit these blocks from rising or not to raise the blocks up to the clear position. Hence, simultaneous clearing cannot be simply executed, and the attraction is further enhanced although the difficulty increases.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-157986 filed on May 27, 2004, which is hereby incorporated by reference herein.

What is claimed is:

1. A computer system comprising:
   a processor,
   an operation unit which inputs an operation to a game,
   a display unit which displays information associated with the game, and
   a computer-readable storage unit which stores program instructions and data required to execute the game,
wherein execution of the program instructions by said processor controls the computer system to:
   generate display data of falling objects which are displayed to fall from an upper portion to a lower portion in a predetermined display area on the display unit, and storing the display data in the storage unit;
   read-out the generated display data of the falling objects from the storage unit, and displaying the falling objects to fall from the upper portion to the lower portion in the predetermined display area;
   change, when the falling objects reach a falling stop position in the display area, the display data to display the falling objects as stop objects whose falling movement stops, and storing the changed display data in the storage unit;
   designate the predetermined number or less of stop objects in accordance with a designation instruction from the operation unit; and
   change, when the stop objects are designated, the display data of stop objects to re-arrange positions of the designated stop objects in accordance with a re-arrange instruction from the operation unit, and storing the changed display data in the storage unit;
   determine whether the re-arranged stop objects and the stop objects which are located around the re-arranged stop objects meet a predetermined ignition condition;
   calculate, when the ignition condition is met, an impelling force of launched and rising objects formed by the re-arranged stop objects and the stop objects based on the number of the re-arranged stop objects and the stop objects, the impelling force being in a rising direction from the lower portion to the upper portion in the predetermined display area on the display unit and the impelling force defining a rising distance of the launched and rising objects in the rising direction;
   change, when the ignition condition is met, display data of a plurality of stop objects which meet the ignition condition based on the impelling force to display data that express the launched and rising objects which are launched and rise in the rising direction from the lower portion to the upper portion in the predetermined display area on the display unit, and storing the changed display data in the storage unit; and change, when the launched and rising objects reach a predetermined clear position in the display area, the display data to clear display of the launched and rising objects, wherein the launched and rising objects are launched and rise apart from the rest of the stop objects.

2. The computer system according to claim 1, wherein said program instructions control the computer system to:

designate, when a plurality of launched and rising objects are launched and rising, the predetermined number of launched and rising objects included in the plurality of launched and rising objects in accordance with a designation instruction from the operation unit; and change the display data of the launched and rising objects to rearrange positions of the predetermined number of designated launched and rising objects in accordance with a re-arrange instruction from the operation unit, and storing the changed display data in the storage unit.

3. The computer system according to claim 2, wherein said program instructions control the computer system to:

change, when stop objects fewer than the predetermined number are designated in accordance with a designation instruction from the operation unit, the display data of the stop objects to rise the designated stop objects within a range that does not reach the clear position, and store the changed display data in the storage unit.

4. The computer system according to claim 3, wherein said program instructions control the computer system to:

change, when the stop objects fewer than the predetermined number are rising and a display position of the stop object matches a display position of the falling object, the display data of the stop object and the falling object to clear the stop object and the falling object, and store the changed display data in the storage unit.

5. The computer system according to claim 3, wherein said program instructions control the computer system to:

change, when the stop objects fewer than the predetermined number are rising and a display position of the stop object matches a display position of the rising object, the display data of the stop object to display data expressing a new rising object, and store the changed display data in the storage unit.

6. The computer system according to claim 1, wherein the launched and rising objects are formed by three or more re-arranged stop objects and stop objects located around the re-arranged stop objects, which have the same type, and line up vertically or horizontally.

7. The computer system according to claim 1, wherein said program instructions control the computer system to:

change not only display data of a plurality of stop objects which meet the ignition condition, but also display data of other stop objects located above the stop objects to be display data that express the launched and rising objects, and store the changed display data in the storage unit.

8. The computer system according to claim 7, wherein said program instructions control the computer system to:

inhibit, when the ignition condition is not met, the display data of the stop objects from being changed to display data that express the launched and rising objects, or changing the display data of the stop objects to display data that express rising stop objects which stop rising before the clear position is reached, and store the changed display data in the storage unit.

9. The program product according to claim 1, wherein a lowest block in the launched and rising objects is displayed with a fire image to express launching.

10. A game apparatus having:

a processor;

an operation unit which inputs an operation to a game, a display unit which displays information associated with the game, and a computer-readable storage unit which stores program instructions and data required to execute the game, wherein execution of the program instructions by the processor causes the game apparatus to provide a game, the apparatus comprising:

means for generating display data of falling objects which are displayed to fall from an upper portion to a lower portion in a predetermined display area on the display unit, and storing the display data in the storage unit;

means for reading out the generated display data of the falling objects from the storage unit, and displaying the falling objects to fall from the upper portion to the lower portion in the predetermined display area;

means for, when the falling objects reach a falling stop position in the display area, changing the display data to display the falling objects as stop objects whose falling movement stops, and storing the changed display data in the storage unit;

means for designating the predetermined number or less of stop objects in accordance with a designation instruction from the operation unit; and means for, when the stop objects are designated, changing the display data of stop objects to re-arrange positions of the predetermined number of designated stop objects in accordance with a re-arrange instruction from the operation unit, and storing the changed display data in the storage unit;

means for determining whether the re-arranged stop objects and the stop objects which are located around the re-arranged stop objects meet a predetermined ignition condition;

means for calculating, when the ignition condition is met, an impelling force of launched and rising objects formed by the re-arranged stop objects and the stop objects based on the number of the re-arranged stop objects and the stop objects, the impelling force being in a rising direction from the lower portion to the upper portion in the predetermined display area on the display unit and the impelling force defining a rising distance of the launched and rising objects;

means for, when the ignition condition is met, changing display data of a plurality of stop objects which meet the ignition condition based on the impelling force to display data that express the launched and rising objects which are launched and rise in the rising direction from the lower portion to the upper portion in the predetermined display area on the display unit, and storing the changed display data in the storage unit; and means for, when the launched and rising objects reach a predetermined clear position in the display area, changing the display data to clear display of the launched and rising objects, wherein the launched and rising objects are launched and rise apart from the rest of the stop objects.

11. The apparatus according to claim 10, further comprising:

means for, when a plurality of rising objects are launched and rising, designating the predetermined number of launched and rising objects included in the plurality of launched and rising objects in accordance with a designation instruction from the operation unit; and means for changing the display data of the launched and rising objects to re-arrange positions of the predetermined number of designated launched and rising objects in accordance with a re-arrange instruction from the operation unit, and storing the changed display data in the storage unit.

12. The apparatus according to claim 11, further comprising means for, when stop objects fewer than the predetermined number are designated in accordance with a designation instruction from the operation unit, changing the display data of the stop objects to rise the designated stop objects within a range that does not reach the clear position, and storing the changed display data in the storage unit.

13. The apparatus according to claim 12, further comprising means for, when the stop objects fewer than the predetermined number are rising and a display position of the stop object matches a display position of the falling object, changing the display data of the stop object and the falling object to clear the stop object and the falling object, and storing the changed display data in the storage unit.

14. The apparatus according to claim 12, further comprising means for, when the stop objects fewer than the predetermined number are rising and a display position of the stop object matches a display position of the rising object, changing the display data of the stop object to display data expressing a new rising object, and storing the changed display data in the storage unit.

15. The apparatus according to claim 10, wherein the launched and rising objects are formed by three or more re-arranged stop objects and stop objects located around the re-arranged stop objects, which have the same type, and are juxtaposed vertically or horizontally.

16. The apparatus according to claim 10, further comprising means for changing not only display data of a plurality of stop objects which meet the ignition condition, but also display data of other stop objects located above the stop objects to be display data that express the launched and rising objects, and storing the changed display data in the storage unit.

17. The apparatus according to claim 16, further comprising means for, when the ignition condition is not met, inhibiting the display data of the stop objects from being changed to display data that express the rising objects, or changing the display data of the stop objects to display data that express rising stop objects which stop rising before the clear position is reached, and storing the changed display data in the storage unit.

18. A method of controlling a game apparatus having a processor, an operation unit which inputs an operation to a game, a display unit which displays information associated with the game, and a computer-readable storage unit which stores data required to execute the game, the method comprising:

a step of generating by the processor display data of falling objects which are displayed to fall from an upper portion to a lower portion in a predetermined display area on the display unit, and storing the display data in the storage unit;

a step of reading out by the processor the generated display data of the falling objects from the storage unit, and displaying the falling objects to fall from the upper portion to the lower portion in the predetermined display area;

a step of changing by the processor, when the falling objects reach a falling stop position in the display area, the display data to display on the display unit the falling objects as stop objects whose falling movement stops, and storing the changed display data in the storage unit;

a step of designating by the processor the predetermined number or less of stop objects in accordance with a designation instruction from the operation unit; and a step of changing by the processor, when the stop objects are designated, the display data of stop objects to re-arrange positions of the predetermined number of designated stop objects in accordance with a re-arrange instruction from the operation unit, and storing the changed display data in the storage unit;

a step of determining by the processor whether the re-arranged stop objects and the stop objects which are located around the re-arranged stop objects meet a predetermined ignition condition;

a step of calculating by the processor, when the ignition condition is met, an impelling force of launched and rising objects formed by the re-arranged stop objects and the stop objects based on the number of the re-arranged stop objects and the stop objects, the impelling force being in a rising direction from the lower portion to the upper portion in the predetermined display area on the display unit and the impelling force defining a rising distance of the launched and rising objects;

a step of changing by the processor, when the ignition condition is met, display data of a plurality of stop objects which meet the ignition condition based on the impelling force to display data that express the launched and rising objects which are launched and rise in the rising direction from the lower portion to the upper portion in the predetermined display area on the display unit, and storing the changed display data in the storage unit; and a step of changing by the processor, when the launched and rising objects reach a predetermined clear position in the display area, the display data to clear display of the launched and rising objects from the display unit, wherein the launched and rising objects are launched and rise apart from the rest of the stop objects.

19. The method according to claim 18, further comprising:

a step of designating, when a plurality of launched and rising objects are launched and rising, the predetermined number of launched and rising objects included in the plurality of launched and rising objects in accordance with a designation instruction from the operation unit; and a step of changing the display data of the launched and rising objects to re-arrange positions of the predetermined number of designated launched and rising objects in accordance with a re-arrange instruction from the operation unit, and storing the changed display data in the storage unit.

20. The method according to claim 19, further comprising a step of changing, when stop objects fewer than the predetermined are designated in accordance with a designation instruction from the operation unit, the display data of the stop objects to rise the designated stop objects within a range that does not reach the clear position, and storing the changed display data in the storage unit.

21. The method according to claim 20, further comprising a step of changing, when the stop objects fewer than the predetermined number are rising and a display position of the stop object matches a display position of the falling object, the display data of the stop object and the falling object to clear the stop object and the falling object, and storing the changed display data in the storage unit.

22. The method according to claim 20, further comprising a step of changing, when the stop objects fewer than the predetermined number are rising and a display position of the stop object matches a display position of the rising object, the display data of the stop object to display data expressing a new rising object, and storing the changed display data in the storage unit.

23. The method according to claim 18, wherein the launched and rising objects are formed by three or more re-arranged stop objects and stop objects located around the re-arranged stop objects, which have the same type, and are juxtaposed vertically or horizontally.

24. The method according to claim 18, further comprising a step of changing not only display data of a plurality of stop objects which meet the ignition condition, but also display data of other stop objects located above the stop objects to be display data that express the launched and rising objects, and storing the changed display data in the storage unit.

25. The method according to claim 24, further comprising a step of inhibiting, when the ignition condition is not met, the display data of the stop objects from being changed to display data that express the launched and rising objects, or changing the display data of the stop objects to display data that express rising stop objects which stop rising before the clear position is reached, and storing the changed display data in the storage unit.

26. A computer-readable recording medium having computer program recorded thereon that, when executed by a processor, causes a computer to perform a game in which a player uses an operation input device to control a falling object that falls within a predetermined display area of a display device, and clears the falling object and falling stop objects by combining the falling object and the falling stop objects under a predetermined condition, said computer program causing the computer to execute operations comprising:

generating display data of falling objects which are displayed to fall from an upper portion to a lower portion in the predetermined display area on the display device, and storing the display data in a computer-readable storage unit;

reading out the generated display data of the falling objects from the computer-readable storage unit, and displaying the falling objects to fall from the upper portion to the lower portion in the predetermined display area;

changing, when the falling objects reach a falling stop position in the display area, the display data to display the falling objects as stop objects whose falling movement stops, and storing the changed display data in the computer-readable storage unit;

designating the predetermined number or less of stop objects in accordance with a designation instruction from the operation unit; and changing, when the stop objects are designated, the display data of stop objects to rearrange positions of the designated stop objects in accordance with a re-arrange instruction from the operation unit, and storing the changed display data in the computer-readable storage unit;

determining whether the re-arranged stop objects and the stop objects which are located around the re-arranged stop objects meet a predetermined ignition condition;

calculating, when the ignition condition is met, an impelling force of launched and rising objects formed by the re-arranged stop objects and the stop objects based on the number of the re-arranged stop objects and the stop objects, the impelling force being in a rising direction from the lower portion to the upper portion in the predetermined display area on the display unit and the impelling force defining a rising distance of the launched and rising objects in the rising direction;

changing, when the ignition condition is met, display data of a plurality of stop objects which meet the ignition condition based on the impelling force to display data that express the launched and rising objects which are launched and rise in the rising direction from the lower portion to the upper portion in the predetermined display area on the display unit, and storing the changed display data in the computer-readable storage unit; and changing, when the launched and rising objects reach a predetermined clear position in the display area, the display data to clear display of the launched and rising objects, wherein the launched and rising objects are launched and rise apart from the rest of the stop objects.

* * * * *